US012652476B2

(12) United States Patent (10) Patent No.: US 12,652,476 B2
Ochiai et al. (45) Date of Patent: Jun. 9, 2026

(54) PHOTOELECTRIC CONVERSION APPARATUS, PHOTOELECTRIC CONVERSION SYSTEM, AND MOVABLE OBJECT

(71) Applicant: CANON KABUSHIKI KAISHA, Tokyo (JP)

(72) Inventors: Kei Ochiai, Tokyo (JP); Yoshiaki Takada, Kanagawa (JP); Masaki Sato, Kanagawa (JP); Masahiro Kobayashi, Tokyo (JP); Daisuke Kobayashi, Kanagawa (JP); Tetsuya Itano, Kanagawa (JP); Nao Nakatsuji, Kanagawa (JP); Yasuhiro Oguro, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 18/759,615

(22) Filed: Jun. 28, 2024

(65) Prior Publication Data

US 2024/0357258 A1 Oct. 24, 2024

Related U.S. Application Data

(63) Continuation of application No. PCT/JP2022/000070, filed on Jan. 5, 2022.

(51) Int. Cl.
*H04N 25/772* (2023.01)
*G01S 17/931* (2020.01)
(Continued)

(52) U.S. Cl.
CPC ........... *H04N 25/772* (2023.01); *H04N 25/78* (2023.01); *H04N 25/79* (2023.01); *G01S 17/931* (2020.01)

(58) Field of Classification Search
None
See application file for complete search history.

(56) References Cited

U.S. PATENT DOCUMENTS 11,849,238 B2 * 12/2023 Ochiai ................. H04N 25/772
2015/0215554 A1 * 7/2015 Toyoguchi ........... H04N 23/672
348/300
(Continued)

FOREIGN PATENT DOCUMENTS

JP 2002165126 A 6/2002
JP 2015216334 A 12/2015
(Continued)

*Primary Examiner* — Mark T Monk

(74) *Attorney, Agent, or Firm* — Canon U.S.A., Inc., IP Division

(57) ABSTRACT

A photoelectric conversion apparatus includes a first substrate including a pixel array having a plurality of pixels including a pixel configured to output a focus detection signal and a second substrate layered on the first substrate, the second substrate including an analog-to-digital (A/D) converter including a plurality of A/D conversion circuits that converts a signal output from the first substrate to a digital signal, wherein the second substrate further includes a plurality of signal processing sections configured to perform a mechanical learning process, the second substrate including a first signal processing section and a second signal processing section, wherein the plurality of A/D conversion circuits includes a plurality of different sets, wherein the first signal processing section is disposed in correspondence with one of the plurality of sets, and wherein the second signal processing section is disposed in correspondence with another of the plurality of sets.

17 Claims, 25 Drawing Sheets

(51) Int. Cl.
   *H04N 25/78*     (2023.01)
   *H04N 25/79*     (2023.01)

(56)               References Cited

U.S. PATENT DOCUMENTS

| | | | |
|---|---|---|---|
| 2019/0252421 A1* | 8/2019 | Yoshida | H04N 25/00 |
| 2021/0166117 A1* | 6/2021 | Chu | G06N 3/09 |
| 2021/0168318 A1* | 6/2021 | Eki | G06V 10/147 |

FOREIGN PATENT DOCUMENTS

| | | | |
|---|---|---|---|
| JP | 2018182038 A | 11/2018 | |
| JP | 2020025263 A | 2/2020 | |
| JP | 2020098968 A | 6/2020 | |
| JP | 2021057825 A | 4/2021 | |
| WO | 2021060098 A1 | 4/2021 | |
| WO | 2021/161712 A1 | 8/2021 | |

* cited by examiner

FIG. 3

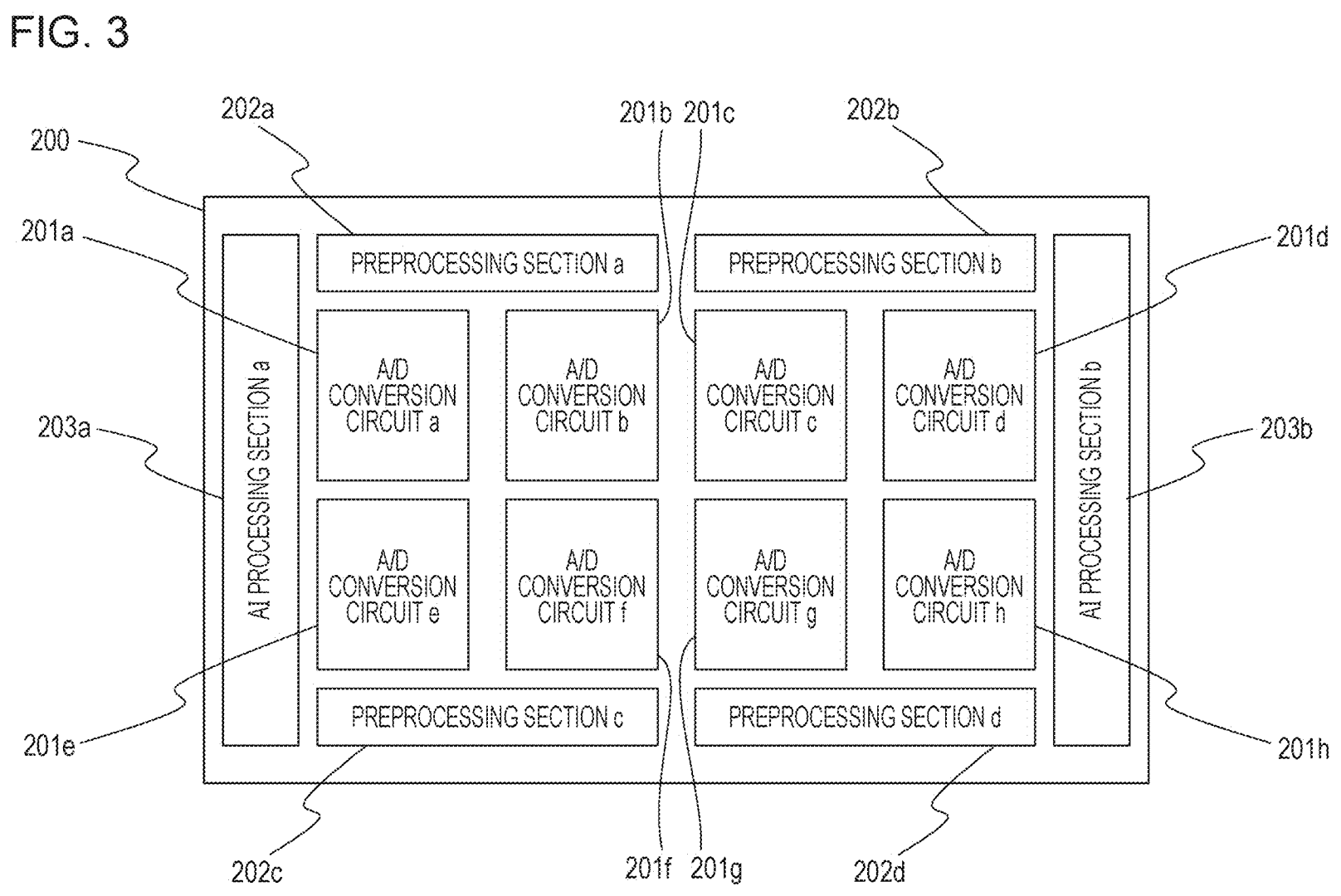

AI PROCESSING SECTION b

PREPROCESSING SECTION b

A/D CONVERSION CIRCUIT c

A/D CONVERSION CIRCUIT d

A/D CONVERSION CIRCUIT g

A/D CONVERSION CIRCUIT h

PREPROCESSING SECTION d

PREPROCESSING SECTION a

A/D CONVERSION CIRCUIT a

A/D CONVERSION CIRCUIT b

A/D CONVERSION CIRCUIT e

A/D CONVERSION CIRCUIT f

PREPROCESSING SECTION c

AI PROCESSING SECTION a 201d
203b
201h
202b
201b 201c
201f 201g
202d
202a
202c
200
201a
203a
201e

FIG. 4

FIG. 17    PROJECTION VIEW OF 110
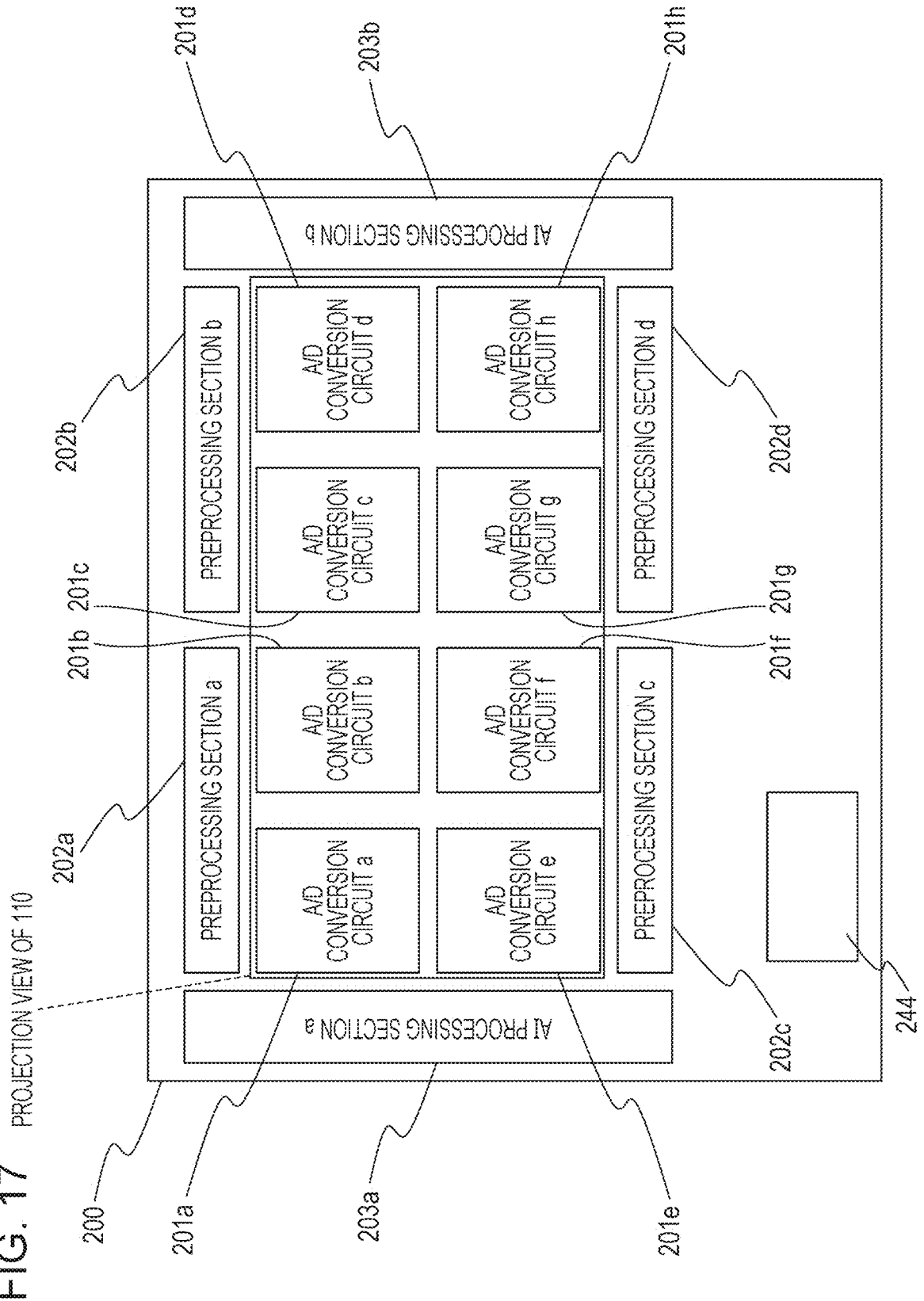

Figure 20:
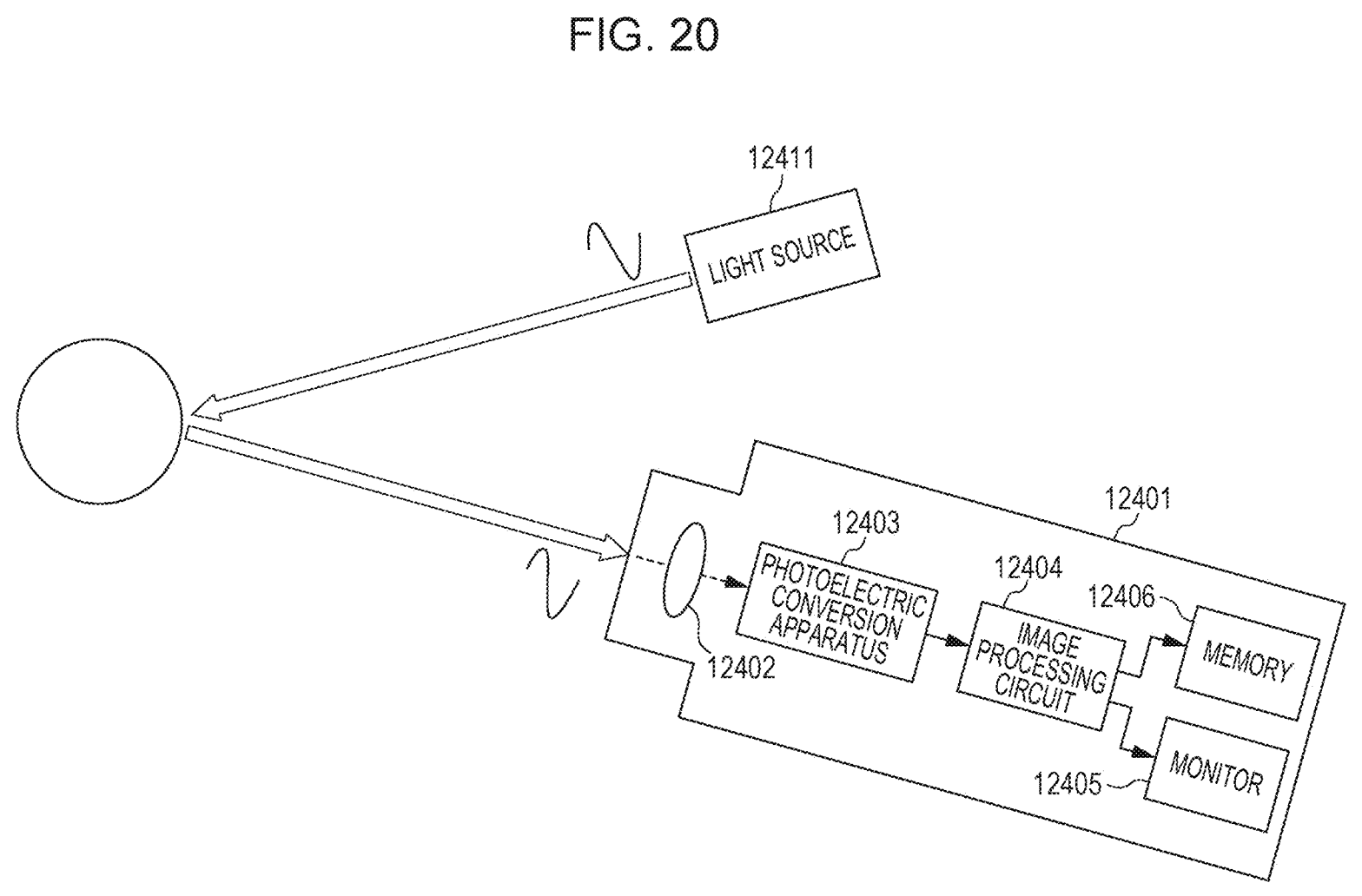

LIGHT SOURCE

12411

12401

12402

PHOTOELECTRIC
CONVERSION
APPARATUS

12403

IMAGE
PROCESSING
CIRCUIT

12404

MEMORY

12406

MONITOR

12405

PHOTOELECTRIC CONVERSION APPARATUS, PHOTOELECTRIC CONVERSION SYSTEM, AND MOVABLE OBJECT

CROSS-REFERENCE TO RELATED APPLICATIONS

This application is a Continuation of International Patent Application No. PCT/JP2022/000070, filed Jan. 5, 2022, which is hereby incorporated by reference herein in its entirety.

TECHNICAL FIELD

The present invention relates to a photoelectric conversion apparatus, a photoelectric conversion system, and a movable object.

BACKGROUND ART

A known photoelectric conversion apparatus that converts incident light to electrical charge has a layered structure in which multiple substrates are layered.

PTL 1 discloses a layered photo-sensor in which a first substrate including pixels and a second substrate including a digital signal processor (DSP) are layered. The digital signal processor executes processing based on a neural network computation model.

CITATION LIST

Patent Literature

PTL 1 Japanese Patent Laid-Open No. 2020-25263

The digital signal processor based on the neural network computation model disposed on the second substrate consumes a large amount of power, leading to a proportional increase in heat generation. The heat generated in the second substrate propagates to the pixel array arranged on the first substrate. This results in an increase in noise contained in the signals output from the pixels. In particular, local heat generation causes output variations in the image surface, which not only decreases the image quality but also makes it difficult to correct the image quality.

Furthermore, with the enhancement of processing based on the neural network computation model, the acceleration of signal processing speed is hindered with the method of sequentially performing multiple processes.

If pixels that output focus detection signals are included in the pixel array, processing of the focus detection signals may hinder the acceleration.

SUMMARY OF INVENTION

The present disclosure provides a technique advantageous for dispersing the heat generated from the second substrate and accelerating processing involving machine learning performed in the second substrate.

According to an aspect of the present disclosure, a photoelectric conversion apparatus includes a first substrate including a pixel array having a plurality of pixels including a pixel configured to output a focus detection signal and a second substrate layered on the first substrate, the second substrate including an analog-to-digital (A/D) converter including a plurality of A/D conversion circuits that converts a signal output from the first substrate to a digital signal, wherein the second substrate further includes a plurality of signal processing sections configured to perform a mechanical learning process, the second substrate including a first signal processing section and a second signal processing section, wherein the plurality of A/D conversion circuits includes a plurality of different sets, wherein the first signal processing section is disposed in correspondence with one of the plurality of sets, and wherein the second signal processing section is disposed in correspondence with another of the plurality of sets.

Further features of the present invention will become apparent from the following description of exemplary embodiments with reference to the attached drawings.

BRIEF DESCRIPTION OF DRAWINGS

FIG. 3 is a diagram illustrating the configuration of a second substrate.

FIG. 4 is a diagram illustrating the configuration of a second substrate.

FIG. 17 is a diagram illustrating the configuration of a second substrate.

FIG. 18 is a diagram illustrating the configuration of a cross section of a photoelectric conversion apparatus.

FIG. 19 is a functional block diagram of a photoelectric conversion system.

FIG. 20 is a functional block diagram of a distance image sensor.

DESCRIPTION OF EMBODIMENTS

Embodiments will be described hereinbelow with reference to the drawings.

The following embodiments are described mainly using a photoelectric conversion apparatus as an example of a photoelectric conversion apparatus. However, the embodiments are applicable not only to the photoelectric conversion apparatus but also to other examples of the photoelectric conversion apparatus. Examples include distance measuring apparatuses (apparatuses for measuring distance using focus detection or Time Of Flight (TOF)) and photometric apparatuses (apparatuses for measuring the amount of incident light).

The conductivity types of the transistors described in the embodiments are illustrative only and are not limited to the conductive types described in the embodiments. The conductivity types may be changed from the conductive types described in the embodiments as appropriate, and the electrical potentials of the gate, the source, and the drain of each transistor may be changed with the change as appropriate.

For example, in the case of a transistor that is operated as a switch, the low level and the high level of the electrical potential applied to the gate may be reversed from the description of the embodiments with a change in conductivity type. The conductivity types of the semiconductor regions described in the embodiments are also provided merely for illustrative purposes and are not limited to the conductive types described in the embodiments. The conductivity types may be changed from the conductivity types described in the embodiments as appropriate, and the electrical potentials of the semiconductor regions may be changed with the change as appropriate.

Figure 1A:
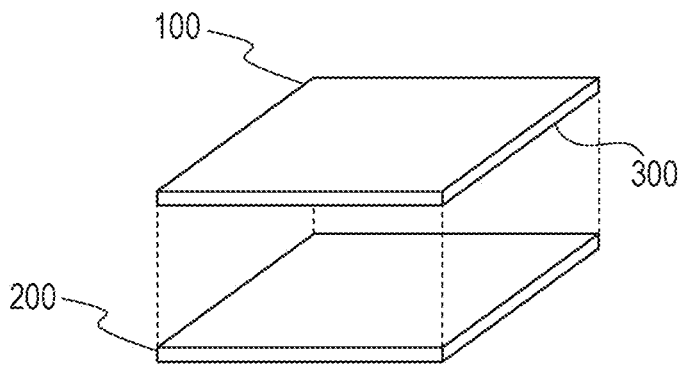
FIG. 1A is a diagram illustrating the configuration of a photoelectric conversion apparatus.
Figure 1B:
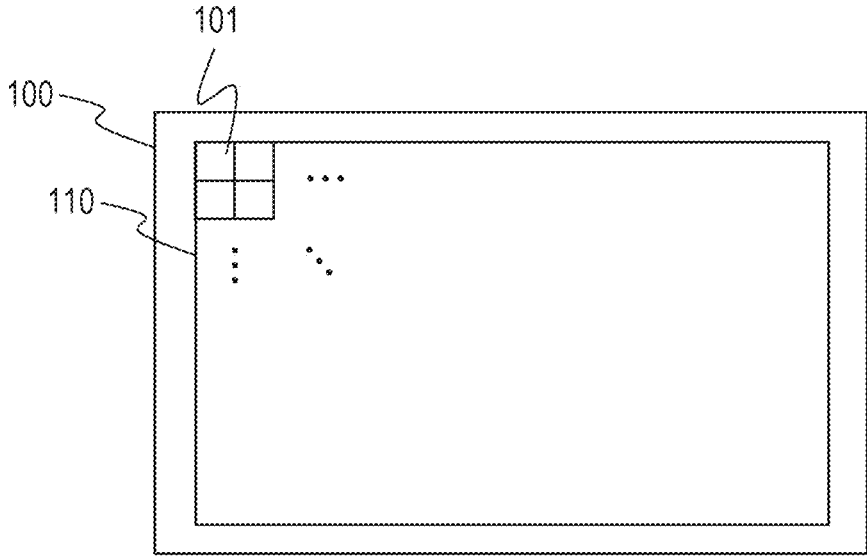
FIG. 1B is a diagram illustrating the configuration of a photoelectric conversion apparatus.

FIG. 1A is a schematic diagram of a layered photoelectric conversion apparatus according to a first embodiment. A first substrate 100 and a second substrate 200 are semiconductor substrates. The first substrate 100 includes a pixel array section 110 in which multiple unit pixels 101 are arrayed in rows and columns, as illustrated in FIG. 1B. The multiple unit pixels 101 may be arrayed in one row and multiple columns or in one column and multiple rows. Photoelectric conversion apparatuses for use in digital cameras typically include tens of millions of unit pixels 101.

The photoelectric conversion apparatus of this embodiment is a back-illuminated photoelectric conversion apparatus that receives light from the first substrate 100. Between the photoelectric converters and a bonding surface 300, signal lines (now shown) are provided.

Figure 15:
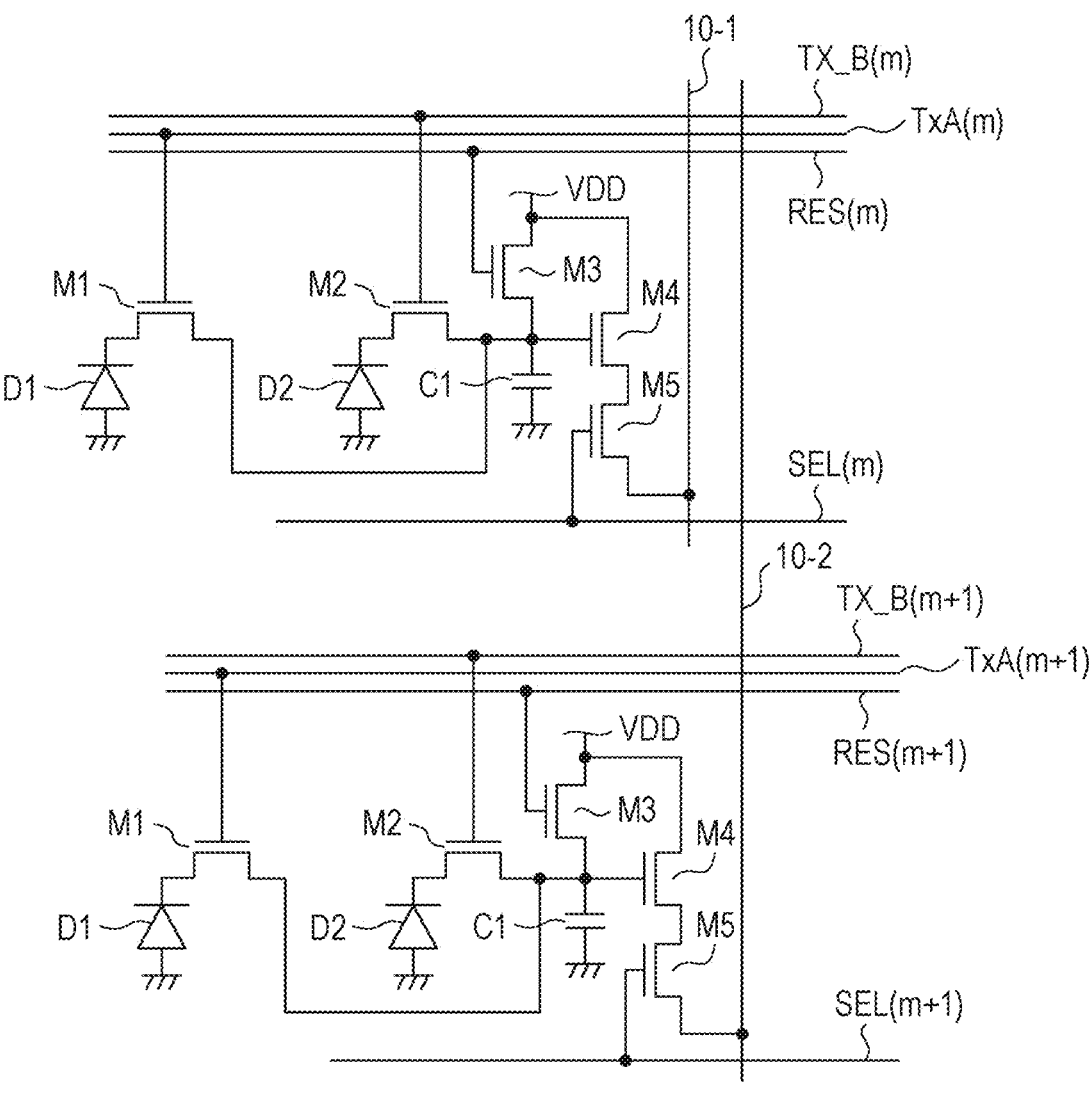
FIG. 15 is a diagram illustrating the configuration of pixels.

FIG. 15 is a circuit diagram illustrating the circuits of the unit pixels 101 in two rows and one column among the unit pixels 101 illustrated in FIGS. 1A and 1B. In the following description, the electric charge accumulated by the photodiode serving as a photoelectric converter are electrons. All of the transistors of the unit pixels 101 are N-type transistors. The electric charge accumulated by the photodiode may be a hole, in which case the transistors of the unit pixel 101 may be P-type transistors. In other words, the conductive type in the following description may be changed based on the polarity of the electric charge treated as a signal.

The unit pixel 101 includes photodiodes D1 and D2, which are photoelectric converters, transfer transistors M1 and M2, a charge converter C1, a reset transistor M3, an amplifying transistor M4, and a selecting transistor M5. The transfer transistor M1 is provided on an electrical pathway between the photodiode D1 and a node to which the charge converter C1, the reset transistor M3, and the amplifying transistor M4 are connected. The transfer transistor M2 is provided on an electrical pathway between the photodiode D2 and a node to which the charge converter C1, the reset transistor M3, and the amplifying transistor M4 are connected. The charge converter C1 is also referred to as a floating diffusion section (FD section). The reset transistor M3 and the amplifying transistor M4 are supplied with a power supply voltage VDD. The selecting transistor M5 is provided on an electrical pathway between the amplifying transistor M4 and a column signal line (vertical output line) 10. In other words, the amplifying transistor M4 is connected to the vertical output line 10 via the selecting transistor M5. The charge converter C1 includes a floating diffusion capacitance provided in the semiconductor substrate and a parasitic capacitance on the electrical pathway extending from the transfer transistor M1 to the amplifying transistor M5 via the floating diffusion capacitance.

Figure 2:
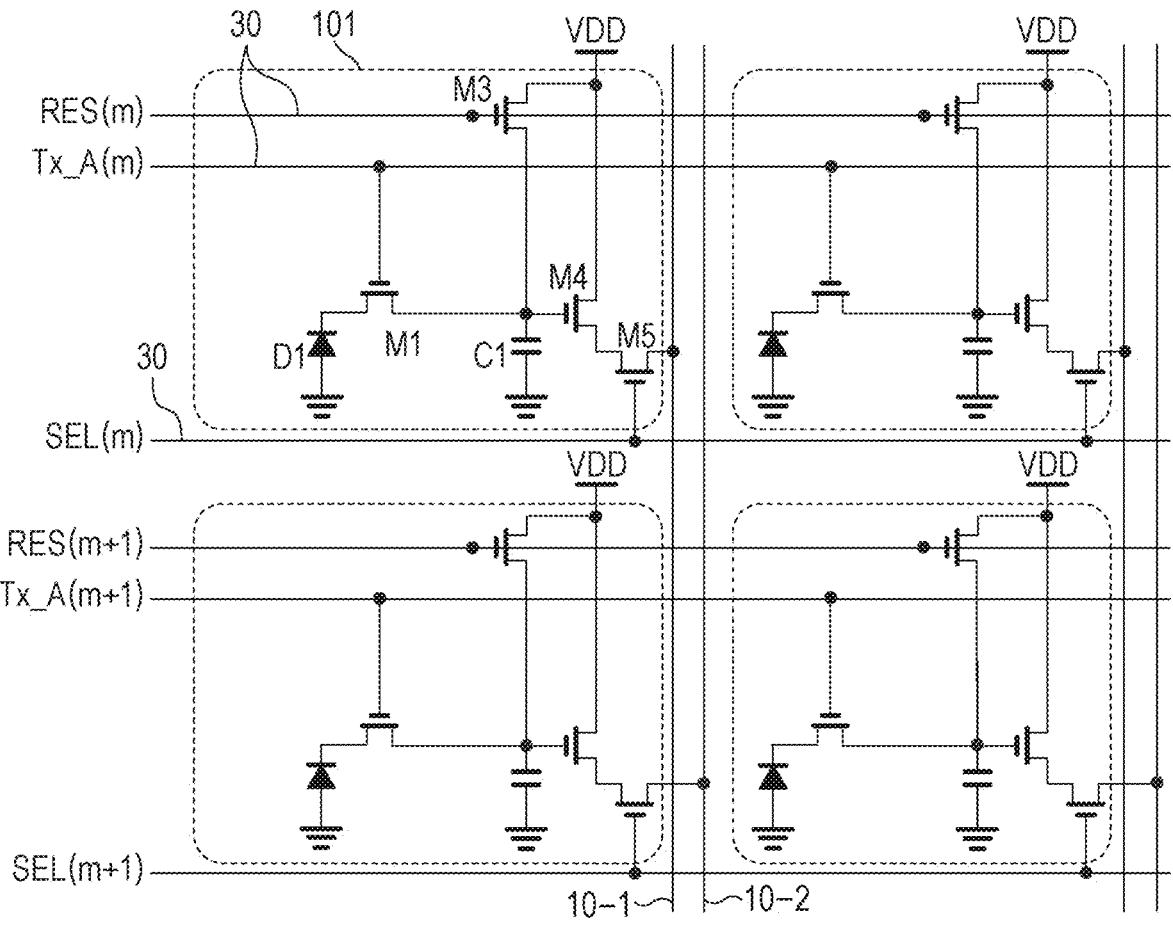
FIG. 2 is a diagram illustrating the configuration of pixels.
Figure 16A:
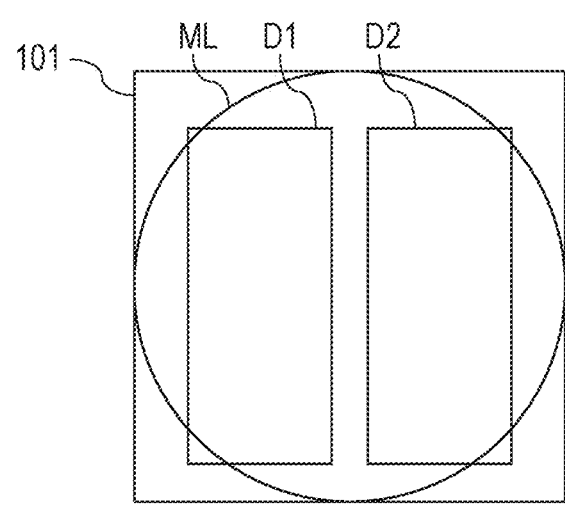
FIG. 16A is a diagram illustrating the configuration of a pixel.

A signal RES, a signal Tx_A, and a signal SEL are each supplied from a vertical scanning circuit (now shown) through a control line 30. In FIG. 2, each signal has the pixel row to which the signal is supplied appended at the end. For example, the signal RES (m) indicates that it is a signal RES supplied to the pixels in the m-th row. The photodiodes D1 and D2 are arranged for one microlens ML, as illustrated in FIG. 16A. In other words, the photodiodes D1 and D2 are arranged so as to receive light that has passed through one microlens ML. This enables focus detection using a phase difference detection method. All of the multiple pixels in the pixel array that receive incident light may have the configuration shown in FIG. 16A. Some pixels may have the configuration of FIG. 16A, while the others may have the configuration shown in FIG. 2, including one photodiode D1.

A current source (not shown) is connected to each of the vertical output lines 10-1 and 10-2. The selecting transistor M5 of the unit pixel 101 in the m-th row is turned on when the signal SEL (m) becomes active. As a result, current is supplied from the current source to the amplifying transistor M4 of the unit pixel 101 in the, m-th row. In the unit pixel 101 in the m-th row, a source follower circuit is formed by a power supply voltage VDD, the amplifying transistor M4, and the current source (not shown) connected to the vertical output line 10-1. The source follower circuit allows the amplifying transistor M4 to output a signal based on the electrical potential of the charge converter C1 to the vertical output line 10-1 via the transistor M5.

The selecting transistor M5 of the unit pixel 101 in the m+1-th row is turned on when the signal SEL (m+1) becomes active. As a result, current is supplied from the current source to the amplifying transistor M4 of the unit pixel 101 in the, m+1-th row. In the unit pixel 101 in the m+1-th row, a source follower circuit is formed by the power supply voltage VDD, the amplifying transistor M4, and the current source (not shown) connected to the vertical output line 10-2. The source follower circuit allows the amplifying transistor M4 to output a signal based on the electrical potential of the charge converter C1 to the vertical output line 10-2 via the transistor M5.

Thus, the unit pixel 101 in the m-th row and the unit pixel 101 in the m+1-th row are connected to the different vertical output lines 10.

The configuration illustrated in FIG. 2 is illustrative only. The number of vertical output lines 10 for the unit pixels 101 in one column may be one or two or more. The photoelectric converters may be avalanche photodiodes or any other photoelectric converters.

The second substrate 200 includes multiple A/D conversion circuits 201a to 201h for converting analog signals output from the unit pixels 101 to digital signals, as illustrated in FIG. 3. The second substrate 200 further includes multiple preprocessing sections 202a to 202d for converting digital data output from the A/D conversion circuits 201a to 201h to image data.

The second substrate 200 further includes multiple artificial intelligence (AI) processing sections 203a and 203b, which are signal processing sections for executing processing based on a neural network computation model on the image data converted by the preprocessing sections 202a to 202d. The AI processing sections 203a and 203b each include a memory that stores a learning model including weighting coefficients for a neural network.

The first substrate 100 and the second substrate 200 illustrated in FIGS. 1A and 1B and FIG. 3 are bonded with the bonding surface 300 to form the layered photoelectric conversion apparatus.

FIGS. 1A and 1B and FIG. 3 illustrate the unit pixels 101, the A/D conversion circuits 201a to 201h, the preprocessing sections 202a to 202d, and the AI processing sections 203a and 203b as the components constituting the photoelectric conversion apparatus. In addition, control lines for controlling the unit pixels 101 and vertical output lines for transmitting signals output from the unit pixels 101 as illustrated in FIG. 2 are arranged on the first substrate 100 as appropriate. Furthermore, vertical scanning circuits, drive circuits, such as a timing generator, and output circuits for outputting image data are arranged on the first substrate 100 or the second substrate 200.

An analog signal output from each unit pixel 101 on the first substrate 100 is input to an adjacent A/D conversion circuit of the A/D conversion circuits 201a to 201h on the second substrate 200 depending on the position of the unit pixel 101 on the first substrate 100. For example, an analog signal output from the unit pixel 101 at the upper left viewed from the top of FIG. 1B is input to the A/D conversion circuit 201a disposed at the upper left of the second substrate 200. Likewise, an analog signal output from the unit pixel 101 at the lower right is input to the A/D conversion circuit 201h disposed at the lower right of the second substrate 200. Each of the A/D conversion circuits 201a to 201h includes multiple A/D converters arranged in multiple rows and columns. Each of the multiple A/D converters is disposed in correspondence with one of the vertical output lines 10-n illustrated in FIG. 2. The method of A/D conversion of the A/D converters is not limited and may be any of A/D conversion methods, such as a slope type, $\Delta\Sigma$ type, and consecutive comparison type.

The digital data, which is a digital signal output from each of the A/D conversion circuits 201a to 201h is input to the adjacent preprocessing section of the preprocessing sections 202a to 202d on the second substrate 200 depending on the position of the A/D conversion circuits 201a to 201h on the second substrate 200. For example, the digital data output from the A/D conversion circuits 201a and 202b is input to the preprocessing section 202a, and the digital data output from the A/D conversion circuits 201g and 202h is input to the preprocessing section 202d.

The preprocessing sections 202a to 202h perform signal processing on the digital signals output from corresponding one of the A/D conversion circuits 201. This signal processing may be some image processing, such as correlated double sampling (CDS), offset elimination, and amplification processing. For example, if the image data to be processed is a color image, the preprocessing section 202 converts the format of the image data to YUV image data or RGB image data. The preprocessing section 202 executes denoising, white balance control, or other processing on the target image data as needed. Furthermore, the preprocessing section 202 executes various kinds of signal processing (also referred to as preprocessing) on the target image data, necessary for the AI processing section 203 to process the target image data.

The AI processing sections 203a and 203b execute processing based on the neural network computation model on the image data converted by the adjacent corresponding one of the preprocessing sections 202a to 202d. For example, for the image data converted by the preprocessing sections 202a and 202c, the AI processing section 203a performs the processing, and for the image data converted by the preprocessing sections 202b and 202d, the AI processing section 202b performs the processing.

The A/D converter includes the A/D conversion circuits 201a to 201h. The A/D converter includes, as multiple pairs, two pairs of A/D conversion circuits. One pair includes A/D conversion circuits 201a and 201b, and the other pair includes the A/D conversion circuits 201c and 201d. One preprocessing section 202 is provided for the two A/D conversion circuits included in one pair. In other words, one pair includes two A/D conversion circuits and one preprocessing section. Each of the AI processing sections 203a and 203b is provided for two pairs.

The AI processing section 203a, which is a first signal processing section, is provided for the A/D conversion circuits 201a and 201b included one of multiple pairs. The AI processing section 203b, which is a second signal processing section, is provided for the A/D conversion circuits 201c and 201d included the other of multiple pairs. These multiple pairs are arranged in multiple rows and columns. The multiple pairs are arranged between the first signal processing section and the second signal processing section.

The AI processing sections 203a and 203b are arranged at the right and left sides of the second substrate 200, as illustrated in FIG. 3. Processing based on neural network computation models generally consume a large amount of power and results in significant heat generation in the AI processing section. The heat generated in the second substrate 200 propagates also to the first substrate 100 through the bonding surface 300, causing an increase in dark current in the pixel array 100 due to the heated unit pixel 101 and unevenness (variations) in dark current due to temperature variations. The dark-current variations generated in the pixel array 100 causes output variations in the image data obtained by the layered photoelectric conversion apparatus, which causes a decrease in the image quality and difficulty in correcting the image quality.

Arranging the multiple AI processing sections 203 as in FIG. 3 may reduce local heat generation in the second substrate 200. This may reduce the unevenness of dark current and output variations of image data. Arranging the AI processing sections 203 for the individual pairs of multiple A/D conversion circuits allows parallel processing, thereby achieving high-speed mechanical learning processing.

Arranging the AI processing sections 203a and 203b so as to flank the A/D converters (A/D conversion circuits 201a to 201h) on the second substrate 200 allows the heat generated in the AI processing sections 203 to be dissipated well. This may more reduce the impact of the heat generated in the second substrate 200 on the pixel array 100 of the first substrate 100.

In this embodiment, the AI processing sections 203a and 203b are arranged on the right and left sides of the second substrate 200. This is illustrative only, and the AI processing sections 203a and 203b may be arranged on the upper and lower sides. Although this embodiment shows a configuration in which the first substrate 100 and the second substrate 200 are layered as an example, this is illustrative only. An additional semiconductor substrate may be provided. For example, a third substrate may be provided between the first substrate 100 and the second substrate 200. The third substrate may be equipped with a memory device.

To enhance the effect of dissipating the heat generated in the second substrate, the AI processing sections may be arranged on opposing two sides, three sides, or four sides of the second substrate.

By arranging the AI processing sections in areas excluding the area directly under the pixel array section 110 of the first substrate 100, the impact of the heat generated from the AI processing sections on the unit pixels 101 may be minimized.

Even if the AI processing sections are arranged directly under the pixel array section 110, a decrease in the quality of the image data may be prevented by arranging the AI processing sections in areas excluding an area directly under a light-shielding pixel area (described later) of the pixel array section 110.

The light-shielding pixels are disposed to detect an optical black level (black level) and are shielded by a light-shielding film such as metal. If the amount of heat applied to the light-shielding pixels are minimal, the light-shielding pixel may normally detect the optical black level, which allows for correction of the values output from unit pixels 101 other than the light-shielding pixels whose output values have changed due to the heat. The light-shielding pixels may be disposed around the four sides of the pixel array section 110 but may be disposed on two sides in L shape. In this case, in plan view in which the pixel array section 110 is projected to the second substrate, the AI processing sections 203 may be disposed only in the vicinity of two sides without the light-shielding pixels, with no AI processing section disposed on the two sides with the light-shielding pixels. This configuration may reduce the impact of the heat generated from the AI processing sections 203 on the light-shielding pixels.

Figure 16B:
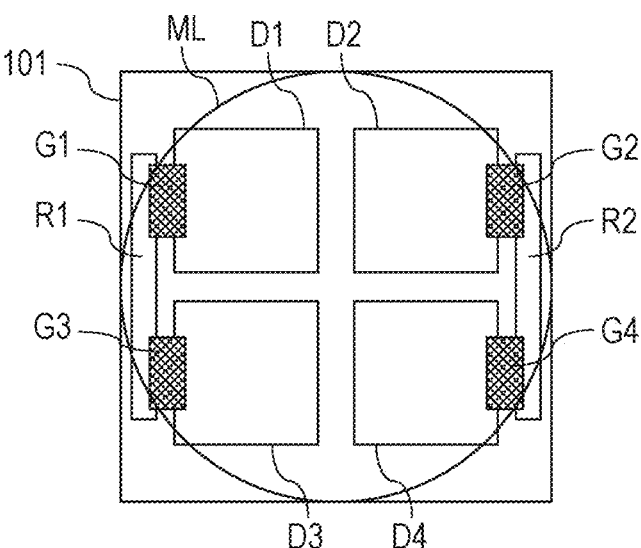
FIG. 16B is a diagram illustrating the configuration of a pixel.

The configuration of the pixels of this embodiment is not limited to the configuration illustrated in FIGS. 15 and 16A. Three or more photoelectric converters may be provided for one microlens ML. For example, the configurations illustrated in FIGS. 16B and 16C include four photodiodes D1 to D4 as four photoelectric converters for one microlens ML. One transfer transistor is provided for each of photodiodes D1 to D4, and gates G1 to G4 are the gate electrodes of the corresponding transfer transistors. In FIG. 16B, the gates G1 and G3 transfer electric charge to a pixel read circuit R1, and the gates G2 and G4 transfer electric charge to a pixel read circuit R2. Each of the pixel read circuits R1 and R2 includes the charge converter C1 shown in FIG. 15. The reset transistor M3, the amplifying transistor M4, and the selecting transistor M5 shown in FIG. 15 may be provided in each of the pixel read circuits R1 and R2 or one of the pixel read circuits R1 and R2.

Figure 16C:
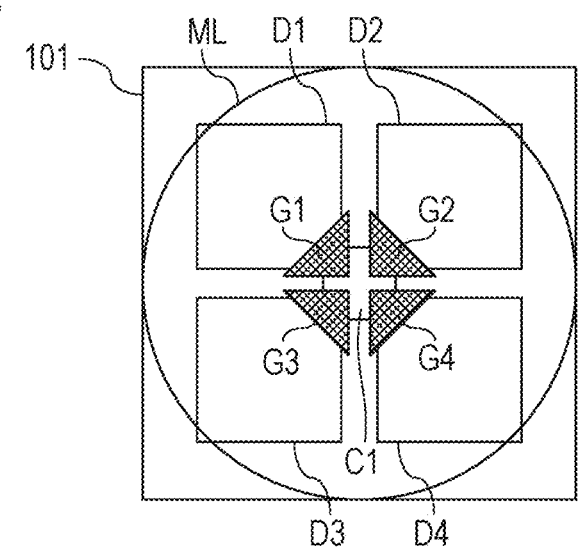
FIG. 16C is a diagram illustrating the configuration of a pixel.

FIG. 16C illustrates a configuration in which the gate G1 to G4 are configured to transfer electric charge to one capacitive element C1. This embodiment is also suitably applicable to such configurations.

In this configuration, light is incident on both of the photodiodes D1 and D2 provided for one microlens ML. In another example, one of the photodiodes D1 and D2 may be shielded from light, and the other may receive light. In this case, some unit pixels 101 are configured to receive light with one of the photodiodes D1 and D2, and the other unit pixels 101 are configured to receive light with the other of the photodiodes D1 and D2. This configuration also allows for focus detection based on phase difference detection by reading the signals (focus detection signals) of some unit pixels 101 and some other unit pixels 101. At least some of the multiple pixels in the pixel array should be configured to read focus detection signals.

Thus, the unit pixels 101 of this embodiment have a configuration capable of phase difference detection. This allows the AI processing sections 203 to perform a focus detecting operation. As shown in FIG. 17, in addition to the AI processing sections 203, a detector 244 for focus detection may be provided on the second substrate 200. The detector 244 may be disposed at any position of the second substrate. In FIG. 17, the detector 244 is disposed between the preprocessing section 202c and an end of the second substrate 200. Locating the detector 244 away from the AI processing sections 203, both of which generate heat, makes it easier to maintain uniform temperature across the second substrate 200.

Figure 18:
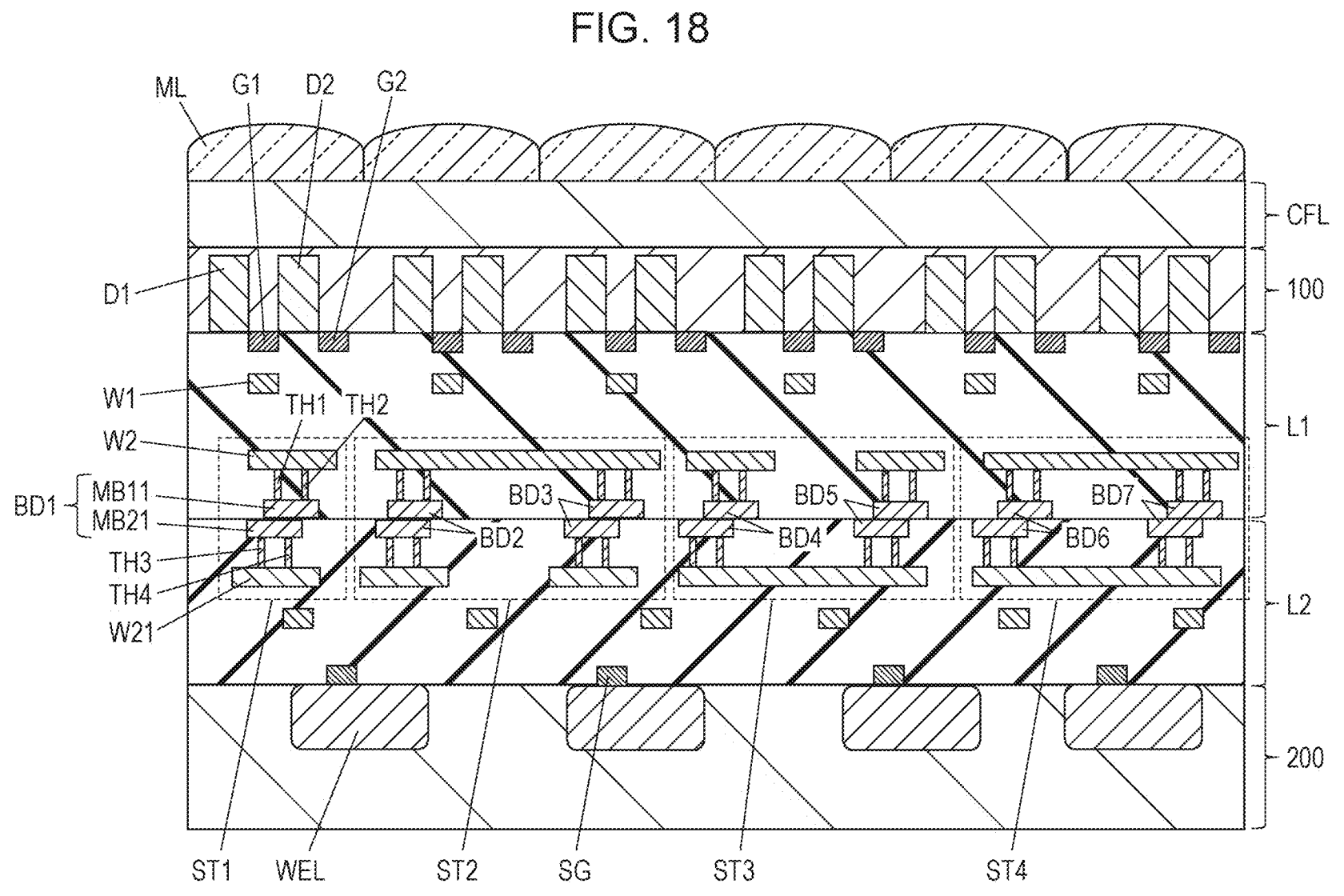

FIG. 18 shows an example of the bonding form of the first substrate 100 and the second substrate 200 in this embodiment.

A first structural layer CFL is provided between the microlenses ML and the first substrate 100. The first structural layer CFL includes an antireflective film, a color filter, and so on. The first structural layer CFL may include a fixed charge film on a first surface (incident surface) of the first substrate 100.

The first substrate 100 is provided with the photodiodes D1 and D2. A second surface of the first substrate 100 is provided with the gates G1 and G2 of the transfer transistors. The gates of the other transistors are also provided on the second surface of the first substrate 100 (now shown).

Between the first substrate 100 and the second substrate 200, a second structural layer L1 and a third structural layer L2 are placed. The second structural layer L1 includes multiple wiring layers and multiple interlayer dielectric films. The multiple wiring layers include wiring layers W1 and W2. The second structural layer L1 include a first conductive portion MB11. The first conductive portion MB11 is connected to the wiring layer W2 with multiple interlayer connections TH1 and TH2.

The third structural layer L2 also includes multiple wiring layers and multiple interlayer dielectric films. The multiple wiring layers include a wiring layer W21. The third structural layer L2 includes a second conductive portion MB21. The first conductive portion MB11 and the second conductive portion MB21 electrically conduct by coming into contact with each other. The first conductive portion MB11 and the second conductive portion MB21 form a bonding portion BD1. The surface on which the first conductive portion MB11 is provided has an insulator film. The surface on which the conductive portion MB21 is provided has an insulator film. The insulator film provided on the surface on which the first conductive portion MB11 is provided and the insulator film provided on the surface on which the conductive portion MB21 is provided are bonded. In other words, on the interface between the second structural layer L1 and the third structural layer L2, the first conductive portion MB11 and the second conductive portion MB21 are bonded, and the insulator film of the second structural layer L1 and the insulator film of the third structural layer L2 are bonded. The insulator film of the second structural layer L1 and the insulator film of the third structural layer L2 contain silicon and oxygen. The second conductive portion MB21 is connected to the wiring layer W21 with multiple interlayer connections TH3 and TH4. The interlayer connections TH1, TH2, TH3, and TH4 should be made of a conductive material such as tungsten. The wiring layers W1, W2, and W21 should also be made of a conductive material such as copper or aluminum. The first conductive portion MB11 and the second conductive portion MB21 constituting the bonding portion BD1 should also be made of a conductive material such as copper.

The second substrate 200 is provided with well areas WEL. Between the second substrate 200 and the wiring layers W, gates SG of the transistors are placed.

FIG. 18 illustrates the structures ST1 to ST4 of some bonding portions. The structure ST1 including the bonding portion BD1 described above has one electrical node formed by one first conductive portion and one second conductive portion. The structures ST2 to ST4 each have one electrical node formed by multiple bonding portions.

In the structure ST2, one wiring line in the second structural layer L1 is connected to multiple bonding portions BD2 and BD3. In contrast, one of the wiring lines in the third structural layer L2 is connected to the bonding portion BD2, and the other wiring line is connected to the bonding portion BD3.

In the structure ST3, one wiring line in the second structural layer L1 is connected to a bonding portion BD4, and the other wiring line is connected to a bonding portion BD5. In contrast, one wiring line in the third structural layer L2 is connected to the bonding portions BD4 and BD5.

In the structure ST4, one wiring line in the second structural layer L1 is connected to bonding portions BD6 and BD7. In contrast, one wiring line in the third structural layer L2 is connected to the bonding portions BD6 and BD7.

These structures ST1 to ST4 may be used selectively according to the position of the photoelectric conversion apparatus and the transmitted signal (voltage).

For example, for a pathway for transmitting a power supply voltage, any one of the structures ST2 to ST4 is selected to decrease the resistance of the transmission pathway. For a pathway for transmitting signals, either row by row or column by column of the unit pixels 101, which are subject to the restriction of the row pitch or column pitch, the structure ST1 is selected.

The bonding portions BD1 to BD7 and the connected wiring lines also serve as heat dissipation pathways. Accordingly, for the bonding portions overlapping with the AI processing sections 203, which generate a lot of heat, in plan view, the heat generated from the AI processing sections 203 may be easily dissipated using any of the structures ST2 to ST4. In particular, the structures ST3 and ST4 are provided with one wiring line of a length to connect to the multiple bonding portions between structures ST3 and ST4 and the second substrate 200. Placing the long wiring line near the AI processing sections 203 that generate a lot of heat enhances heat dissipation.

The first conductive portion MB11 and the second conductive portion MB21 are connected to the interlayer connections TH1 and TH1 and the interlayer connections TH3 and TH4, respectively. This configuration produces the effect of dissipating the heat more than when each of the first conductive portion MB11 and the second conductive portion MB21 has one interlayer connection.

It is also effective to introduce redundancy for the bonding portions overlapping with high-heat-generating circuit elements in plan view. For example, for bonding portions that overlap with the AI processing sections 203 with high heat generation, any of the structures ST2 to ST4 is adopted. This allows, even if one of the two bonding portions of each of the structures ST2 to ST4 experiences poor bonding caused by substrate warpage due to the heat generated from the AI processing section 203, the electrical conduction may be maintained by the other bonding portion.

Although the configuration in FIG. 18 has the multiple photodiodes D1 and D2 for one microlens ML, one photodiode D1 illustrated in FIG. 2 may be provided. Focus detection signals based on phase difference detection may be generated by shielding part of the one photodiode D1. The configuration in FIG. 18 and the matters described in this embodiment may be implemented in combination with the following embodiments. For example, the configurations illustrated in FIG. 15 and FIGS. 16A to 16C are applicable to all of the following embodiments.

Second Embodiment

This embodiment illustrates another configuration of the AI processing sections 203a and 203b described in the first embodiment.

Figure 4:
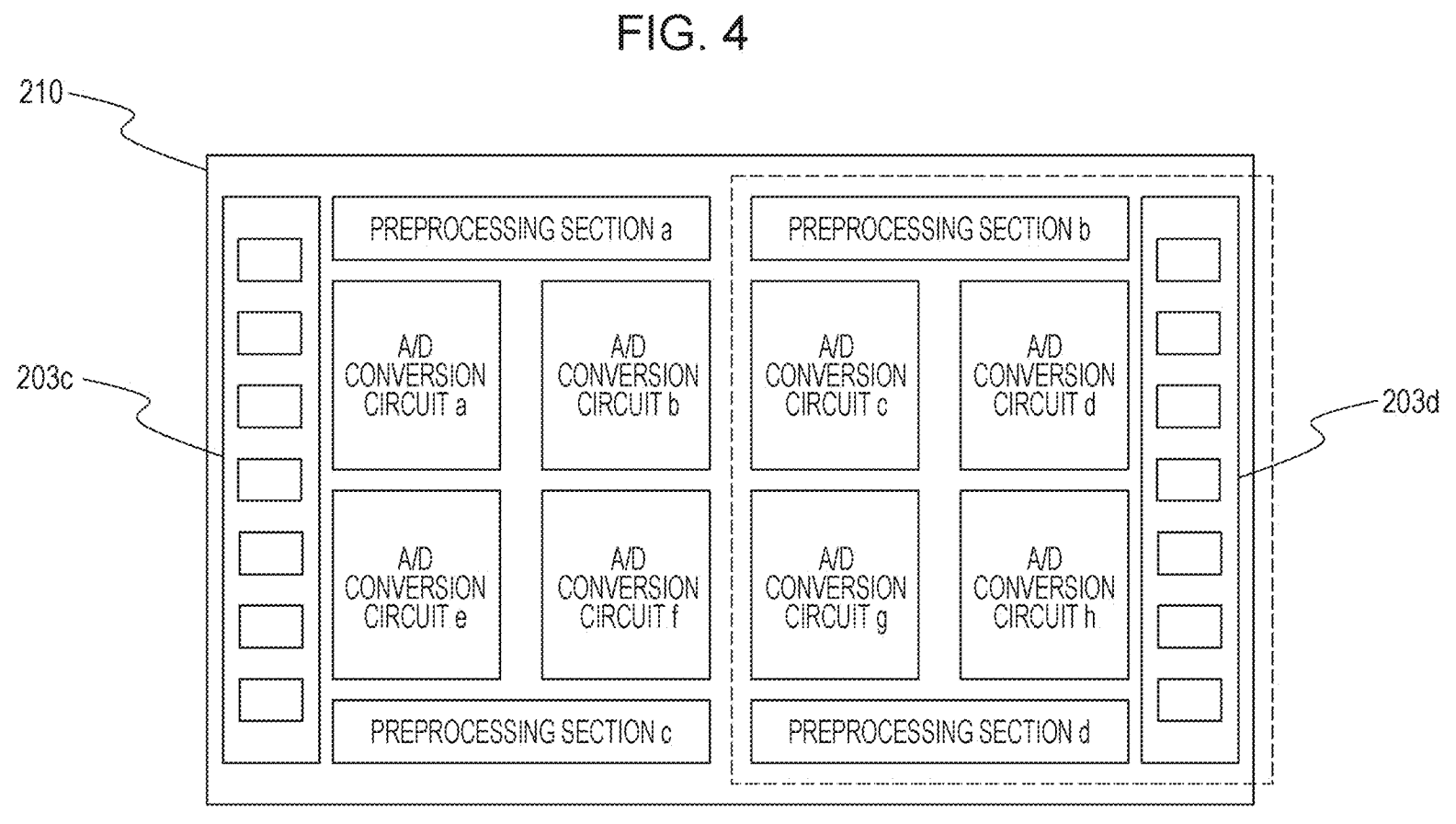

FIG. 4 illustrates an example of the configuration of a second substrate 210 of a photoelectric conversion apparatus according to this embodiment. Since the components other than AI processing sections 203c and 203d are the same as in the first embodiment, the descriptions will be omitted.

In this embodiment, the AI processing sections 203c and 203d have the same configuration and are disposed symmetrically on the right and left ends of the second substrate 210.

Figure 5:
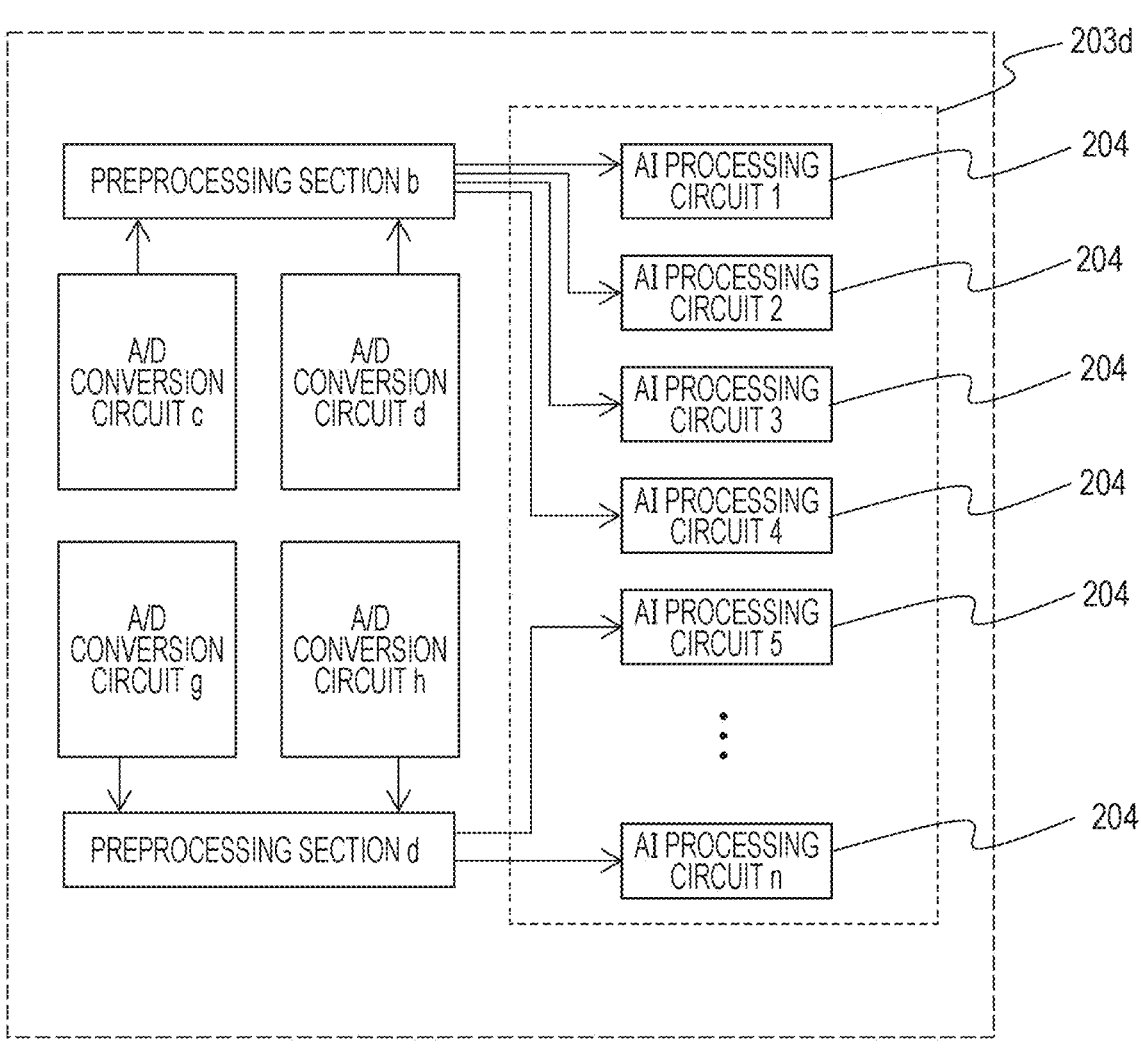
FIG. 5 is a diagram illustrating the configuration of the second substrate.

FIG. 5 is an enlarged view of the dashed line portion of FIG. 4. The AI processing section 203d has n AI processing circuits 204 with the same function therein. The AI processing circuits 204 are electrically directly connected to a preprocessing section 202b or 202d. In this embodiment, the preprocessing section 202b is directly connected to AI processing circuits 1, 2, 3, and 4, and the preprocessing section 202d is directly connected to an AI processing circuit 5 and an AI processing circuit n.

In this embodiment, the number of multiple AI processing circuits 204 of the multiple AI processing sections 203 is larger than the number of the preprocessing sections 202 of the second substrate 210. This allows for a more suitable reduction of the heat generated by the mechanical learning processing.

Distributing the signal processing sections that perform the processing based on the neural network computation models as in this embodiment allows for dispersion of the heat generated in the second substrate 210. This allows for reduction of the impact of the heat generated from the second substrate 210 on the pixel array 100 of the first substrate 100.

Thus, performing parallel processing based on neural network computation models using multiple AI processing circuits allows for faster processing.

Third Embodiment

Figure 6:
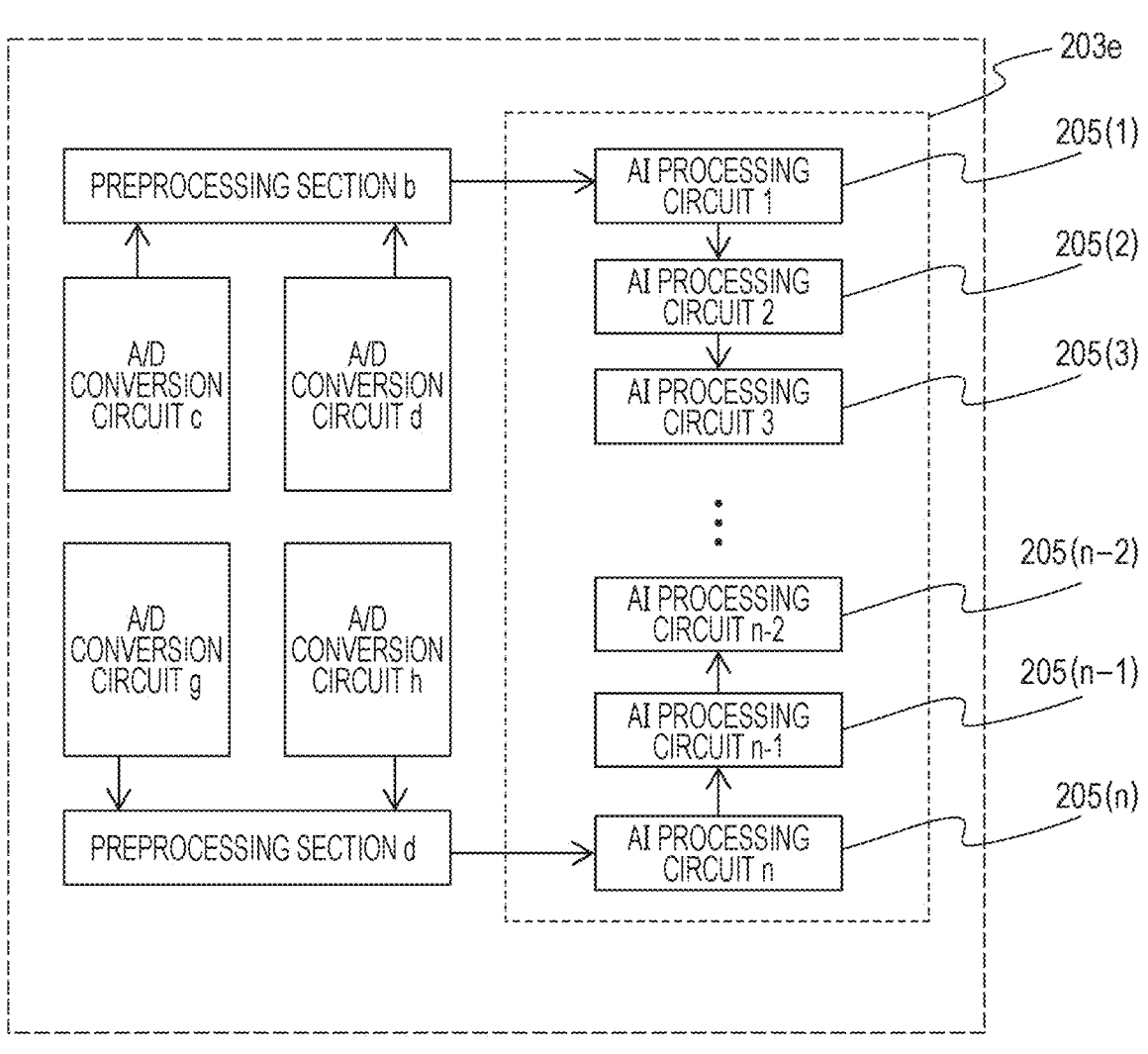
FIG. 6 is a diagram illustrating the configuration of a second substrate.

This embodiment illustrates a modification of the AI processing section 203 of the second embodiment. FIG. 6 is an enlarged view of the dashed line portion of FIG. 4 in the second embodiment. Instead of the AI processing section 203d illustrated in FIG. 4, this embodiment includes an AI processing section 203e illustrated in FIG. 6. The AI processing section 203e in FIG. 6 has the same configuration as the configuration of the AI processing section 203c in FIG. 4. Since the components other than the AI processing section 203e are the same as in the first and second embodiments, descriptions thereof will be omitted.

The AI processing section 203e includes n AI processing circuits 205 with a fixed circuit configuration capable of step-by-step data processing. The AI processing circuits 205(1) to 205(n) are electrically connected in series.

This embodiment illustrates an example in which AI processing is executed in three steps. The image data converted by the preprocessing section 202 is passed to the AI processing circuit 205(1), the AI processing circuit 205(2), and the AI processing circuit 205(3) in this order, where processing based on a neural network computation model is executed.

This embodiment further illustrates an example in which the image data converted by the preprocessing sections 202b and 202d arranged at the upper and lower parts of the second substrate 210 is processed in two parallel processes. In this case, the AI processing circuit 205(1) is electrically directly connected to the preprocessing section 202b, and the AI processing circuit 205(n) is electrically directly connected to the preprocessing section 202d.

Figure 7:
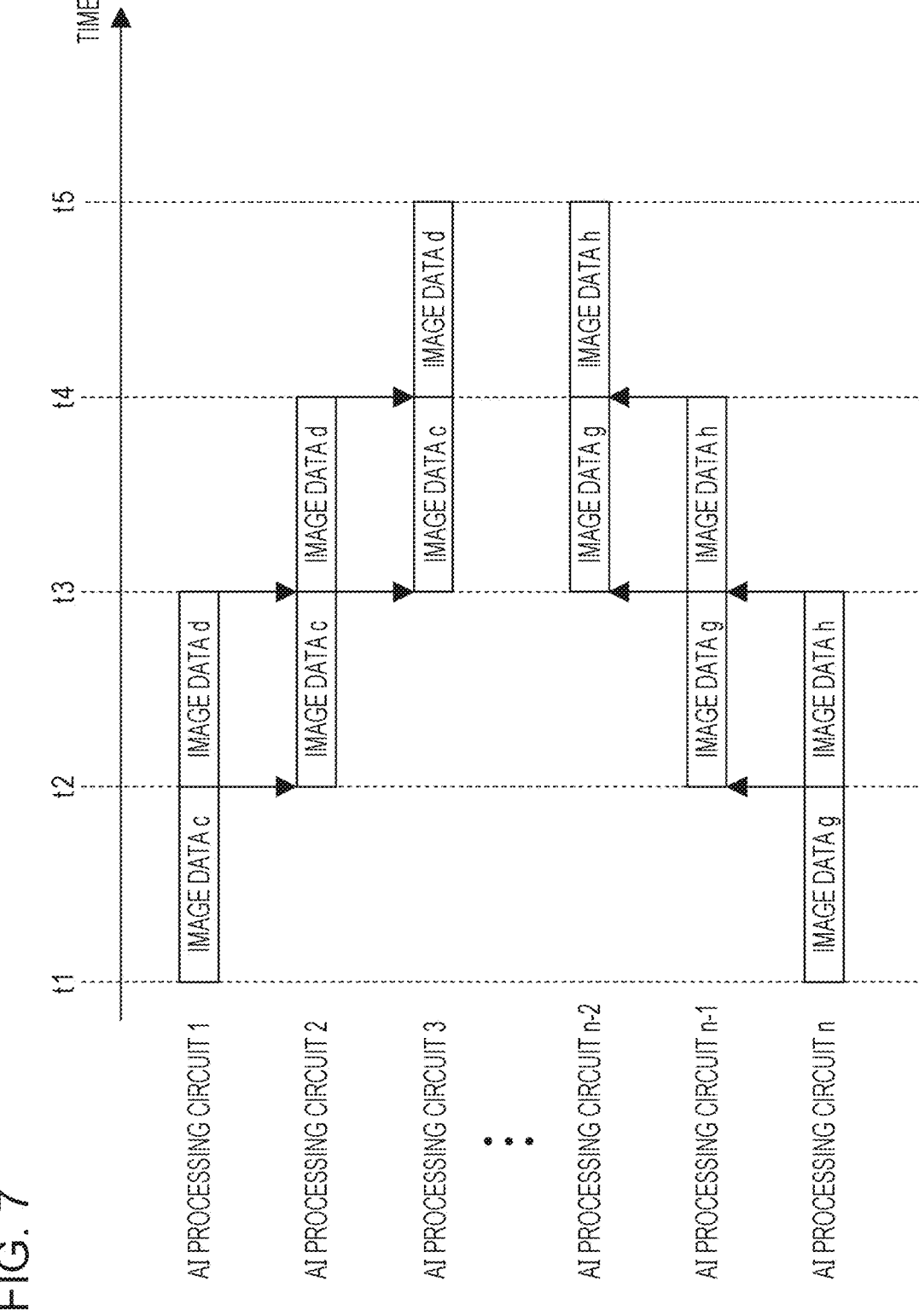
FIG. 7 is a diagram illustrating the operation of the second substrate.

FIG. 7 is a timing chart that schematically illustrates the operation of calculation based on a neural network computation model performed by the AI processing circuits 205(1) to 205(n) of this embodiment. From time t1 to t2, the AI processing circuit 205(1) executes processing based on a neural network computation model for the image data (hereinafter referred to as image data c) converted by the preprocessing section 202b. This image data c is based on the digital data output from the A/D conversion circuit 201c.

Next, from time t2 to t3, the AI processing circuit 205(1) executes processing based on the neural network computation model for the image data (hereinafter referred to as image data d) converted by the preprocessing section 202b. This image data d is based on the digital data output from the A/D conversion circuit 201d.

The image data c is processed by the AI processing circuit 205(1) from time t1 to t2. The image data c is processed by another AI processing circuit 205(2) from time t2 to t3. The AI processing circuits 205(1) and 205(2) have different neural network computation models. Accordingly, the AI processing circuit 205(2) executes processing based on a neural network computation model different from that used for the processing performed by the AI processing circuit 205(1).

From time t3 to t4, the AI processing circuit 205(2) executes processing, for the image data d, based on the neural network computation model different from that used for the processing performed by the AI processing circuit 205(1). The AI processing circuit 205(3) executes processing, for the image data c, based on a neural network computation model different from that used for the processing performed by the AI processing circuit 205(2).

From time t4 to t5, the AI processing circuit 205(3) executes processing, for the image data d, based on a neural network computation model different from that used for the processing performed by the AI processing circuit 205(2). The image data converted by the preprocessing section 202d based on the digital data output from the A/D conversion circuit 201g is referred to as image data d. The image data converted by the preprocessing section 202d based on the digital data output from the A/D conversion circuit 201h is referred to as image data h. Also for the image data d and h, processing based on different neural network computation models is successively executed by the AI processing circuit 205(n-2), the AI processing circuit 205(n-1), and the AI processing circuit 205(n) from time t4 to t5. This processing is as illustrated in FIG. 7.

As described above, the AI processing section 203e of the photoelectric conversion apparatus of this embodiment has a multistage pipeline configuration consisting of three stages and executes processing based on neural network computation models using a serial processing method.

The arrangement of the AI processing circuits 205 in this embodiment are illustrative only. The AI processing circuits may be arranged appropriately according to the amount of heat generated by the AI processing circuits and the number of processing stages. In FIG. 6, the AI processing circuits 205 are arranged in series from the upper end and the lower end of the second substrate 210 toward the center in plan view seen from above the second substrate 210. This is illustrative only. The AI processing circuits 205 may be arranged in series from the center to the upper end and the lower end of the second substrate 210. The AI processing circuit connected to the preprocessing section 202b may be disposed at the upper end of the second substrate 210, and the AI processing circuit connected to the preprocessing section 202d may be disposed at the center of the second substrate 210. In this case, the image data converted by the preprocessing sections 202b and 202d is passed from the upper end to the lower end seen from above the second substrate 210.

Distributing the signal processing sections that perform the processing based on the neural network computation models as in this embodiment allows for dispersion of the heat generated in the second substrate 210. This allows for reduction of the impact of the heat generated from the second substrate 210 on the pixel array 100 of the first substrate 100.

Furthermore, performing parallel processing based on neural network computation models using multiple AI processing circuits allows for faster processing.

Fourth Embodiment

This embodiment illustrates a configuration with a different arrangement of the A/D conversion circuits and the AI processing sections.

Figure 8:
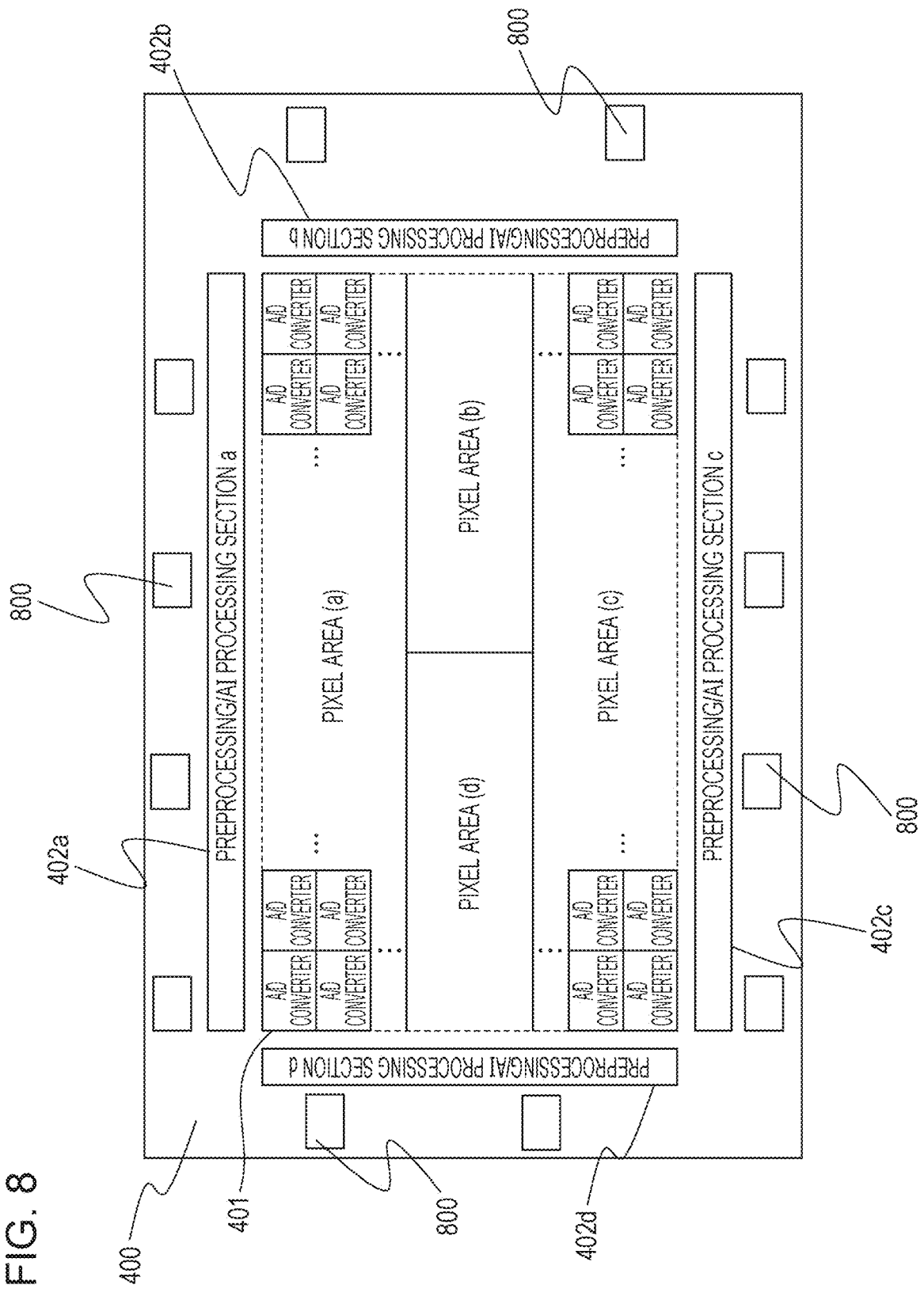
FIG. 8 is a diagram illustrating the configuration of a second substrate.

FIG. 8 is a diagram illustrating the configuration of a second substrate 400 of this embodiment. The photoelectric conversion apparatus of this embodiment has one A/D converter 401 of the second substrate 400 for each unit pixel 101 of the first substrate 100. This allows the analog signals output from all the unit pixels 101 to be collectively converted simultaneously by the A/D converters.

Preprocessing and AI processing sections 402a to 402d illustrated in FIG. 8 convert the digital data converted by the A/D converters 401 to image data. The preprocessing/AI-processing sections 402a to 402d execute processing based on neural network computation models for the converted image data. The circuit regions for preprocessing and AI processing are denoted by 402a to 402d in FIG. 8. The preprocessing/AI-processing sections 402a to 402d are a first signal processing section, a second signal processing section, a third signal processing section, and a fourth signal processing section, respectively.

In FIG. 8, pads 800 to which signals (including power supply voltages) are input from outside the photoelectric conversion apparatus or which output signals to outside the photoelectric conversion apparatus are provided at the four sides of the second substrate 400. The multiple AI processing sections are provided between the outer periphery provided with the pads 800 on the four sides and the A/D converters (the area of the A/D converters 401 arranged in multiple rows and columns). In FIG. 8, the pads 800 are provided on all the four sides of the second substrate 400 but may be provided on opposing two sides.

The digital data output from the A/D converters 401 is input to any of the preprocessing/AI-processing sections 402a to 402d according to the position of the A/D converters 401 on the second substrate 400. For example, the digital data output from the A/D converters 401 arranged in pixel areas (a), (b), (c), and (d) illustrated in FIG. 8 is input to the preprocessing/AI-processing sections 402a, 402b, 402c, and 402d, respectively.

Thus, the multiple areas in which the components that execute processing based on neural network computation models are arranged are arranged at substantially equal intervals. This configuration allows the heat generated from the AI processing sections of the second substrate 400 to be dissipated. This allows for reduction of the impact of the heat generated from the second substrate 400 on the pixel array 100 of the first substrate 100.

Furthermore, performing parallel processing based on neural network computation models using multiple AI processing sections, as in the second embodiment, allows for faster processing.

The AI processing section of this embodiment may have a circuit configuration for executing step-by-step data processing as in the third embodiment. In other words, the AI processing circuits may be electrically connected in series to form a multistage pipeline configuration and execute processing based on neural network computation models using a serial processing method. In this case, the AI processing circuits in the preprocessing/AI-processing sections 402a to 402d have a circuit configuration capable of step-by-step data processing, and the preprocessing/AI-processing sections 402a to 402d are electrically connected in series. In one example, the preprocessing/AI-processing sections 402a to 403d may be connected around the second substrate 400, or only some of the AI processing sections 402a to 402d may be connected. After the AI processing section 402a and the AI processing section 402b are connected, the AI processing section 402c and the AI processing section 402d are connected. The AI processing sections 402a and 402b and the AI processing sections 402c and 402d perform sequential processing. The sequential processing of the AI processing sections 402a and 402b and the AI processing sections 402c and 402d may be performed simultaneously in parallel.

The configuration of the sequential processing and the parallel processing may be made variable by providing a selection switch at the input stage of each of the AI processing sections 402a to 402d.

Fifth Embodiment

The first to fourth embodiments illustrate examples in which multiple AI processing sections provided for multiple pairs perform mechanical learning processing on the digital data of the corresponding pair.

In this embodiment, different AI processing sections perform signal processing frame by frame.

Figure 9:
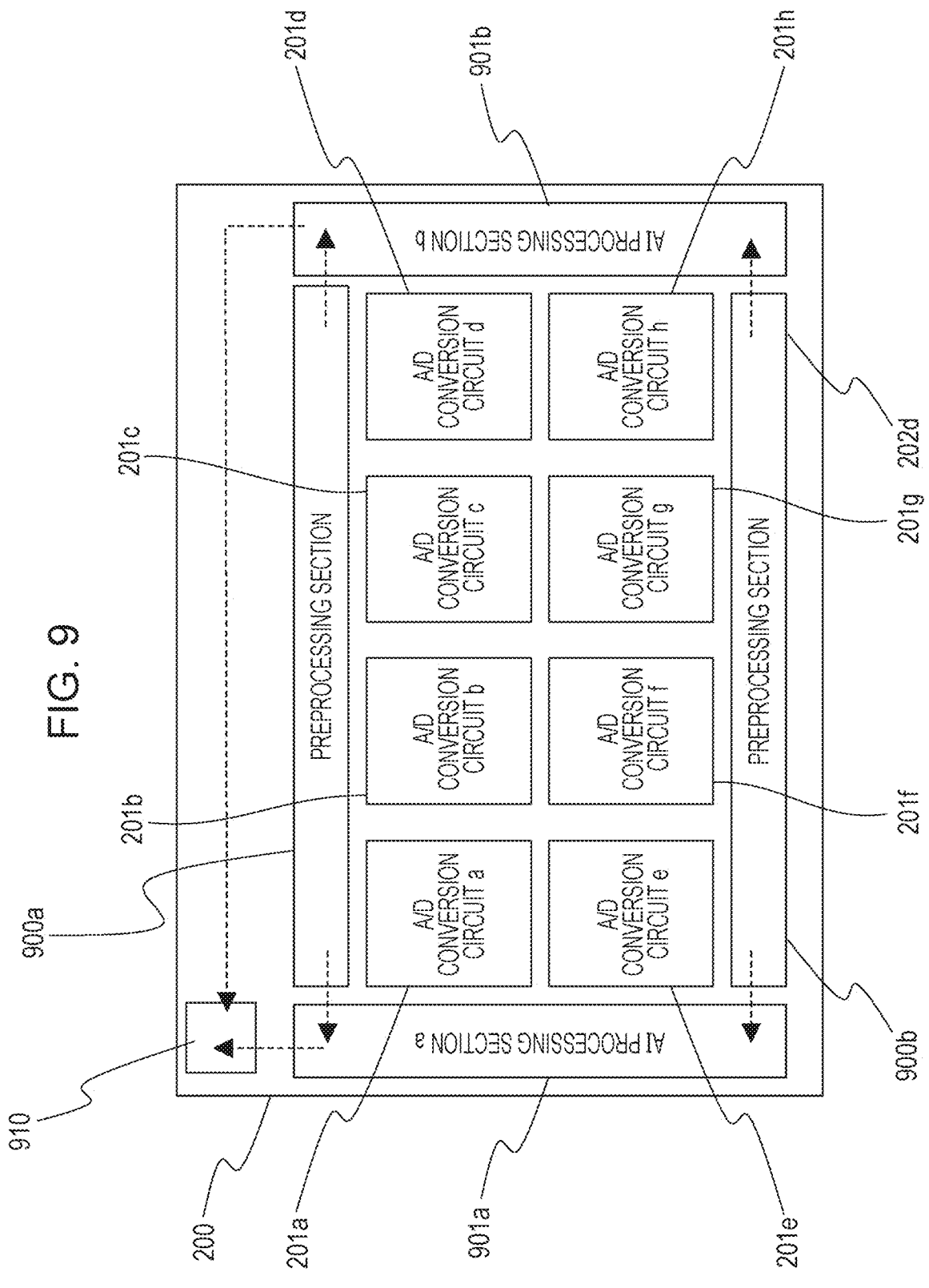
FIG. 9 is a diagram illustrating the configuration of a second substrate.

FIG. 9 is a diagram illustrating the configuration of a second substrate 200 of this embodiment.

A preprocessing section 900a outputs the same data to both of AI processing sections 901a and 901b. A preprocessing section 900b outputs the same data to both of the AI processing sections 901a and 901b. In other words, the AI processing sections 901a and 901b receive the same data from multiple preprocessing sections 900a and 900b. The parameters of the AI processing sections 901a and 901b are adjusted by mechanical learning. The parameters differ between the AI processing sections 901a and 901b. For this reason, even if the same data is input to the AI processing sections 901a and 901b, the output results of the AI processing sections 901a and 901b may differ.

The output results of the AI processing sections 901a and 901b are input to an integrated processing section 910. When the output results of the AI processing sections 901a and 901b differ, the integrated processing section 910 performs any of the following operations.

(1) Selecting a high-reliability output result of the output results of the AI processing sections 901a and 901b and outputting the result to outside of the photoelectric conversion apparatus.

(2) Selecting a corresponding result from a lookup table in the integrated processing section 910 for the combination of the output results of the AI processing sections 901a and 901b and outputting the result.

(3) Outputting the output results of both of the AI processing sections 901a and 901b to outside of the photoelectric conversion apparatus and outputting reliable information The reliability determination of (1) may be performed with reference to the past output result of the AI processing sections 901, or the level of the reliability of the AI processing sections 901a and 901b may be given in advance from outside of the photoelectric conversion apparatus. Reliability information on the output results may be output from the AI processing sections 901a and 901b, and higher reliability information may be selected.

The reliability information of (3) may be based on the output result of the AI processing sections 901a and 901b and may be output to outside of the photoelectric conversion apparatus.

Thus, in the photoelectric conversion apparatus of this embodiment, the multiple AI processing sections 901 perform signal processing involving mechanical learning processing on the same data. This may improve the accuracy of the processing results output from the AI processing sections.

The photoelectric conversion apparatus of this embodiment allows the AI processing sections to have redundancy. In other words, one of the AI processing sections 901a and 901b may fail or significantly decrease in signal accuracy. In such a case, one of the AI processing sections 901a and 901b is stopped, or the output result is ignored, and the output result of the other of the AI processing sections 901a and 901b may be adopted. This allows the operation of the photoelectric conversion apparatus to be continued even if some AI processing section fails or the signal accuracy decreases.

Providing the multiple AI processing sections allows for preventing local heat concentration, as in the first embodiment. The signal processing using the multiple AI processing sections allows a higher speed operation than multiple times of signal processing involving mechanical learning processing using one AI processing section 901.

Sixth Embodiment

In this embodiment, some of the multiple AI processing sections and the others operate alternately frame by frame. This may increase the frame rate.

Figure 10:
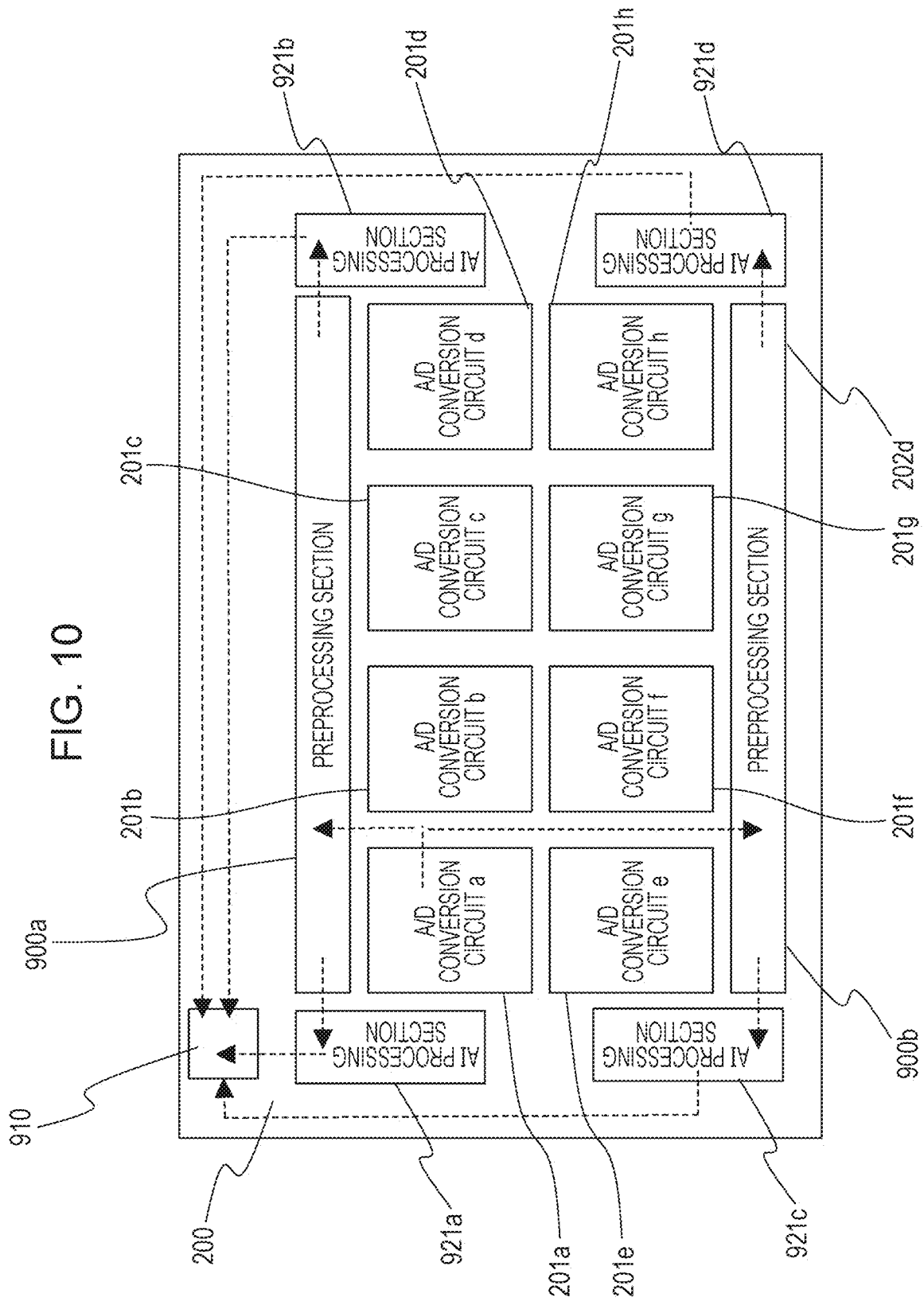
FIG. 10 is a diagram illustrating the configuration of a second substrate.

Although the configuration of the photoelectric conversion apparatus of this embodiment may be the same as in the fifth embodiment, more AI processing sections may be provided, as in FIG. 10. The following description is based on the configuration of FIG. 10.

The configuration of FIG. 10 includes AI processing sections 921a to 921d. The A/D conversion circuits a to h may each output digital data selectively to one of the preprocessing sections 900a and 900b, as is illustrated for the A/D conversion circuit a. Each of the A/D conversion circuits a to h may further has a configuration for outputting digital data in parallel to both of the preprocessing sections 900a and 900b.

Figure 11:
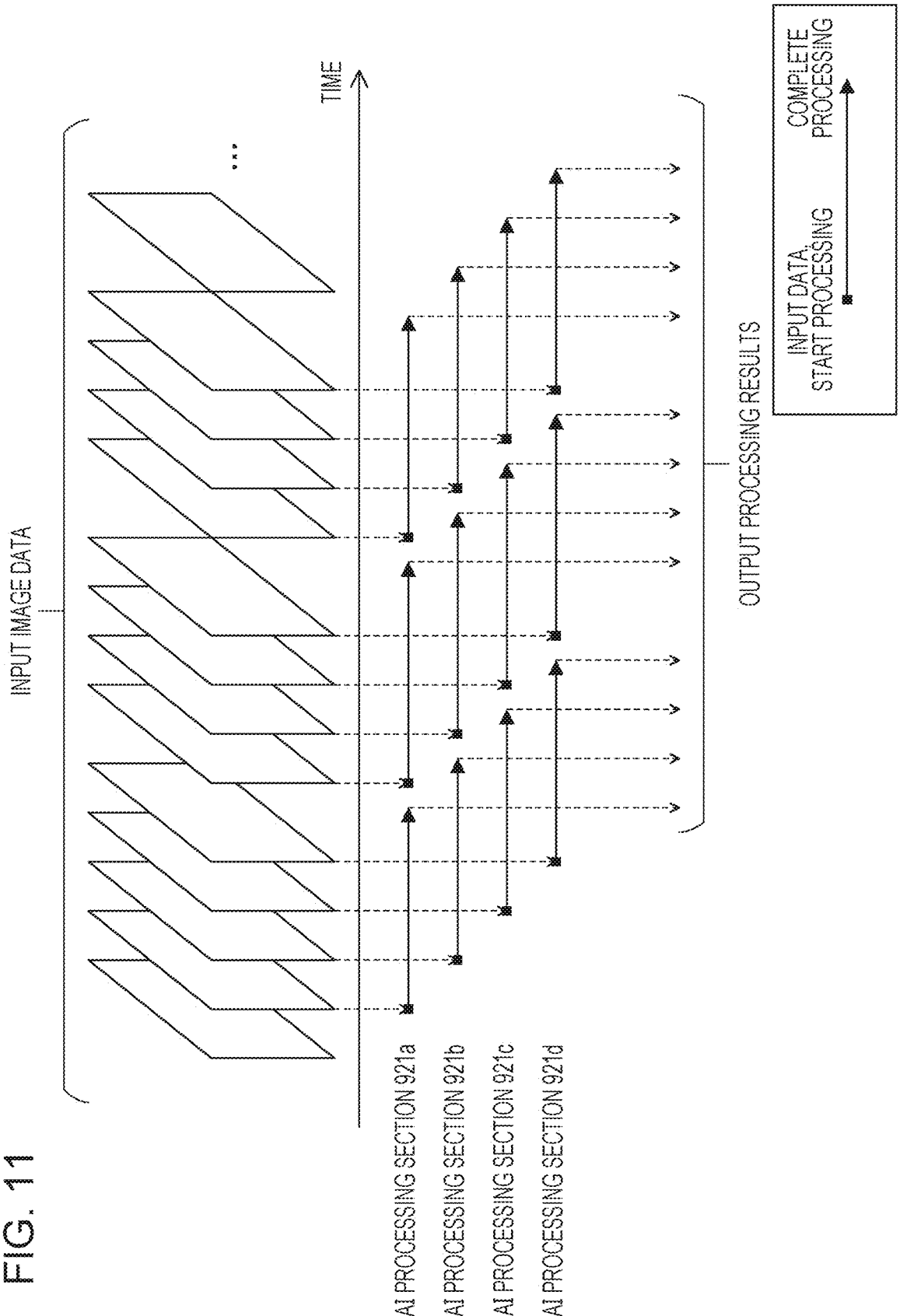
FIG. 11 is a diagram illustrating the operation of a photoelectric conversion apparatus.

FIG. 11 is a diagram illustrating the operation of the AI processing sections 921a to 921d of this embodiment.

FIG. 11 illustrates image data corresponding to the output of one screen of the AI processing sections 921a to 921d of each frame.

The AI processing section 921a starts to process the image data of frame n (n is a natural number). Thereafter, during the period when the AI processing section 921a is processing the image data, another AI processing section 921b starts to process the image data of frame (n+1). Likewise, during the period when the AI processing sections 921a and 921b are processing the image data, an AI processing section 921c starts to process the image data of frame (n+2). Likewise, during the period when the AI processing sections 921a, 921b and 921c are processing the image data, an AI processing section 921d starts to process the image data of frame (n+3).

Thereafter, the AI processing section 921a terminated the processing on the image data and starts to process the image data of frame (n+4) again. The same operation is repeated below.

Since the preprocessing section 900a may selectively output digital data to the AI processing sections 921a and 921b, the image data of the multiple frames may be allocated to the multiple AI processing sections 921a and 921b frame by frame. In the configuration of FIG. 10, the A/D conversion circuits a to h are configured to output digital data selectively to one of the preprocessing sections 900a and 900b, which facilitates allocating the digital data of multiple frames to multiple AI processing sections 921a to 921d.

This embodiment is not limited to the configuration of FIG. 10. For example, the A/D conversion circuits a to h are configured to output digital data selectively to one of the preprocessing sections 900a and 900b. Alternately, the preprocessing sections 900a and 900b may be combined to one preprocessing section 900, and the preprocessing section 900 may be allocated to the four AI processing sections 921a to 921d. The number of AI processing sections 921 is not limited to four; any number equal to or greater than two is acceptable. The trained models of the AI processing sections 921a to 921d may be the same. This allows obtaining output results with similar levels of reliability and accuracy even if different AI processing sections 921 process frame by frame.

The trained models for the multiple AI processing sections 921a to 921d may be made common as follows. First, each of the multiple AI processing sections 921a to 921d performs mechanical learning independently. The mechanical learning may be performed either using or without using training data. After completing the mechanical learning, the AI processing sections 921a to 921d input signals with known expected output results to the photoelectric conversion apparatus. An example in which the expected output result is "the subject is a human face", and an image of a human face is captured by the photoelectric conversion apparatus will be described. The integrated processing section 910 receives the output results of the AI processing sections 921a to 921d. For example, some AI processing sections output the output result "the subject is a human face", and the other AI processing sections output an output result other than "the subject is a human face". In this case, the integrated processing section 910 increases the reliability of the AI processing section 921, among the AI processing sections 921a to 921d, that outputs the correct output result ("the subject is a human face"). The photoelectric conversion apparatus repeats an operation for comparing the expected output result and the actual output results of the AI processing sections 921. This allows the integrated processing section 910 to specify an AI processing section 921 that is likely to output a correct output result among the AI processing sections 921a to 921d. The integrated processing section 910 applies the trained model of the specified AI processing section 921 to the other AI processing sections 921. This allows the multiple AI processing sections 921a to 921d to have a common high-reliability trained model.

Seventh Embodiment

The difference from the sixth embodiment will be mainly described.

The configuration of the photoelectric conversion apparatus of this embodiment may be the same as that of the sixth embodiment.

In this embodiment, the integrated processing section 910 outputs a processing result to outside of the photoelectric conversion apparatus based on the output results of multiple frames output from the multiple AI processing sections.

Figure 12:
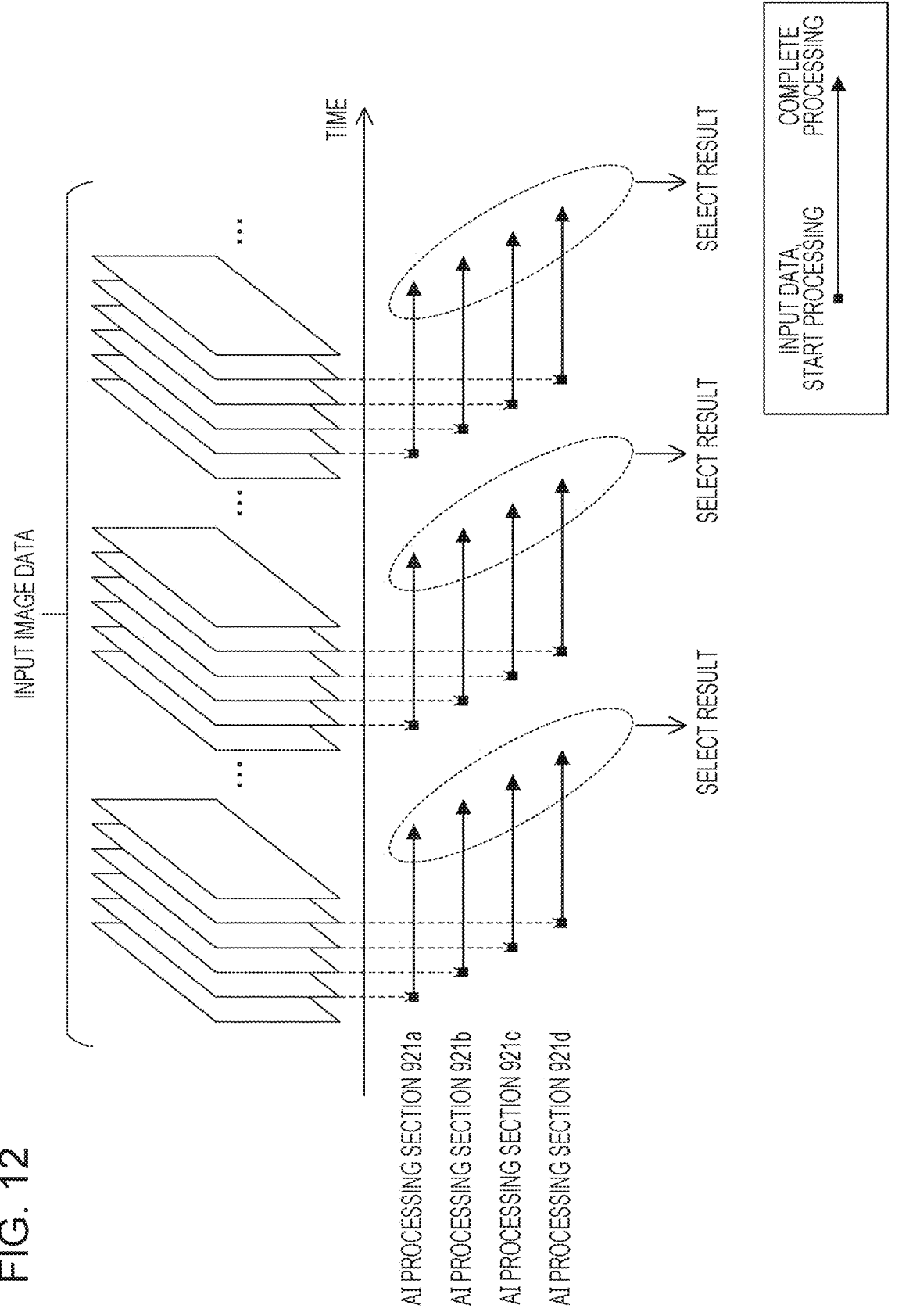
FIG. 12 is a diagram illustrating the operation of a photoelectric conversion apparatus.

FIG. 12 is a diagram illustrating the operation of the AI processing section 921a to 921d illustrated in FIG. 10 in this embodiment. The difference from FIG. 11 is that the integrated processing section 910 performs overall evaluation based on the output results of the multiple AI processing sections 921a to 921d and outputs the processing results to outside of the photoelectric conversion apparatus.

In the overall evaluation, for example, the most frequent output result among the output results of the multiple AI processing sections 921a to 921d is adopted and output. In this case, the multiple AI processing sections 921a to 921d may have the same trained model as in the sixth embodiment.

The multiple AI processing sections 921a to 921d may have different trained models. In this embodiment, after mechanical learning, the AI processing sections 921a to 921d input signals with known expected output results to the photoelectric conversion apparatus. An example in which the expected output result is "the subject is a human face", and an image of a human face is captured by the photoelectric conversion apparatus will be described. The integrated processing section 910 receives the output results of the AI processing sections 921a to 921d. For example, some AI processing sections output the output result "the subject is a human face", and the other AI processing sections output an output result other than "the subject is a human face". In this case, the integrated processing section 910 increases the reliability of the AI processing section 921, among the AI processing sections 921a to 921d, that outputs the correct output result ("the subject is a human face"). The photoelectric conversion apparatus repeats an operation for comparing the expected output result and the actual output results of the AI processing sections 921. This allows the integrated processing section 910 to determine the reliability of each of the AI processing sections 921a to 921d. In the operation of FIG. 12, the integrated processing section 910 assigns reliability parameters to the output results of the AI processing sections 921a to 921d and determines the processing results to be output to outside of the photoelectric conversion apparatus.

Thus, this embodiment may obtain processing results with higher reliability by performing overall evaluation of the processing results of the multiple AI processing sections comprehensively.

Figure 13:
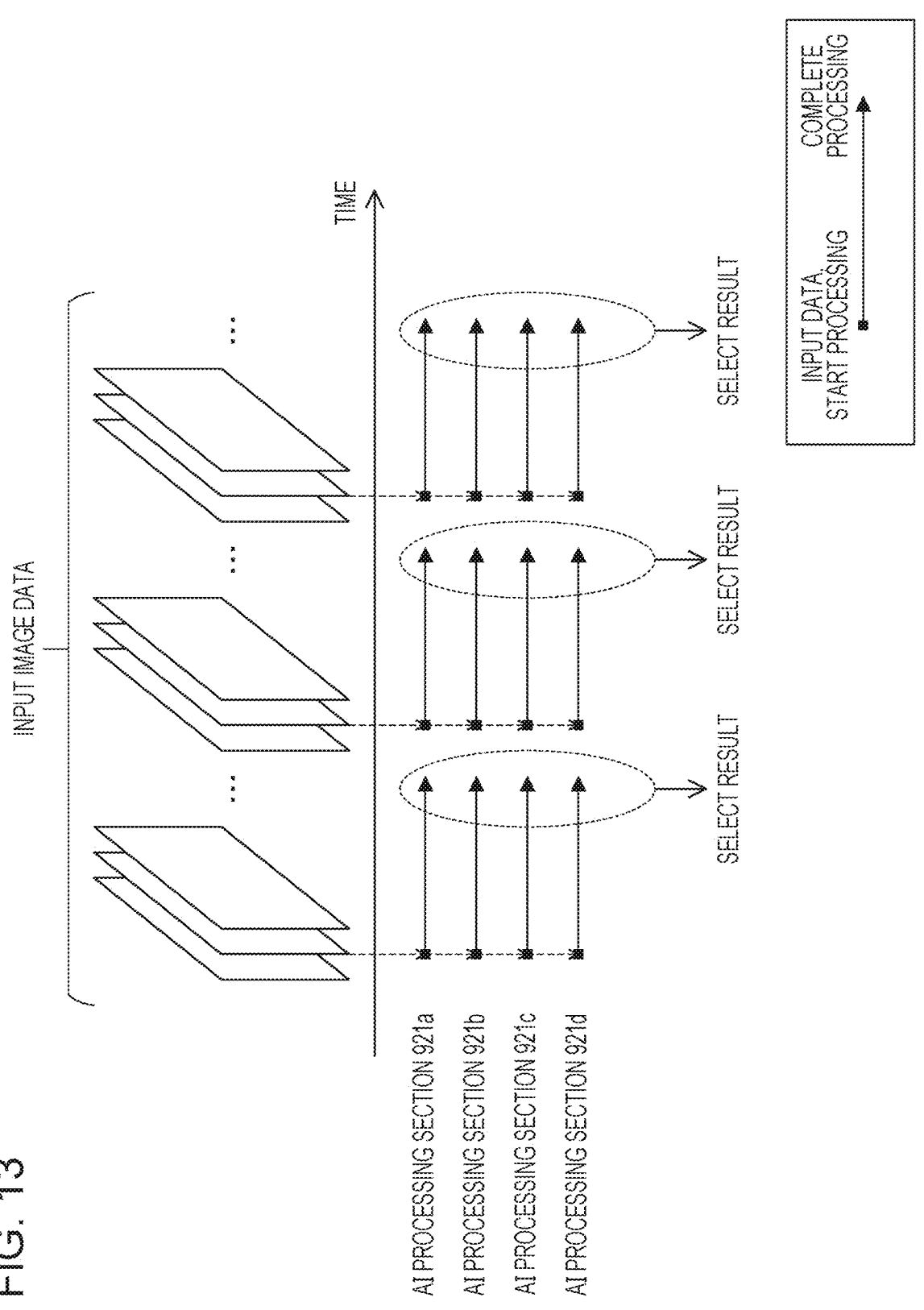
FIG. 13 is a diagram illustrating the operation of a photoelectric conversion apparatus.

This embodiment shows an example in which the multiple AI processing sections 921a to 921d process image data of different frames. In another example, image data of the same frame may be processed by the multiple AI processing sections 921a to 921d, as illustrated in FIG. 13. Also in this case, the integrated processing section 910 should perform overall evaluation as described in this embodiment, and output the processing results to outside of the photoelectric conversion apparatus.

As described in the embodiments, arranging and operating the AI processing sections as in the embodiments allows for preventing the reduction in the accuracy of image data obtained from the photoelectric conversion apparatus and faster operation of the AI processing sections.

Figure 14:
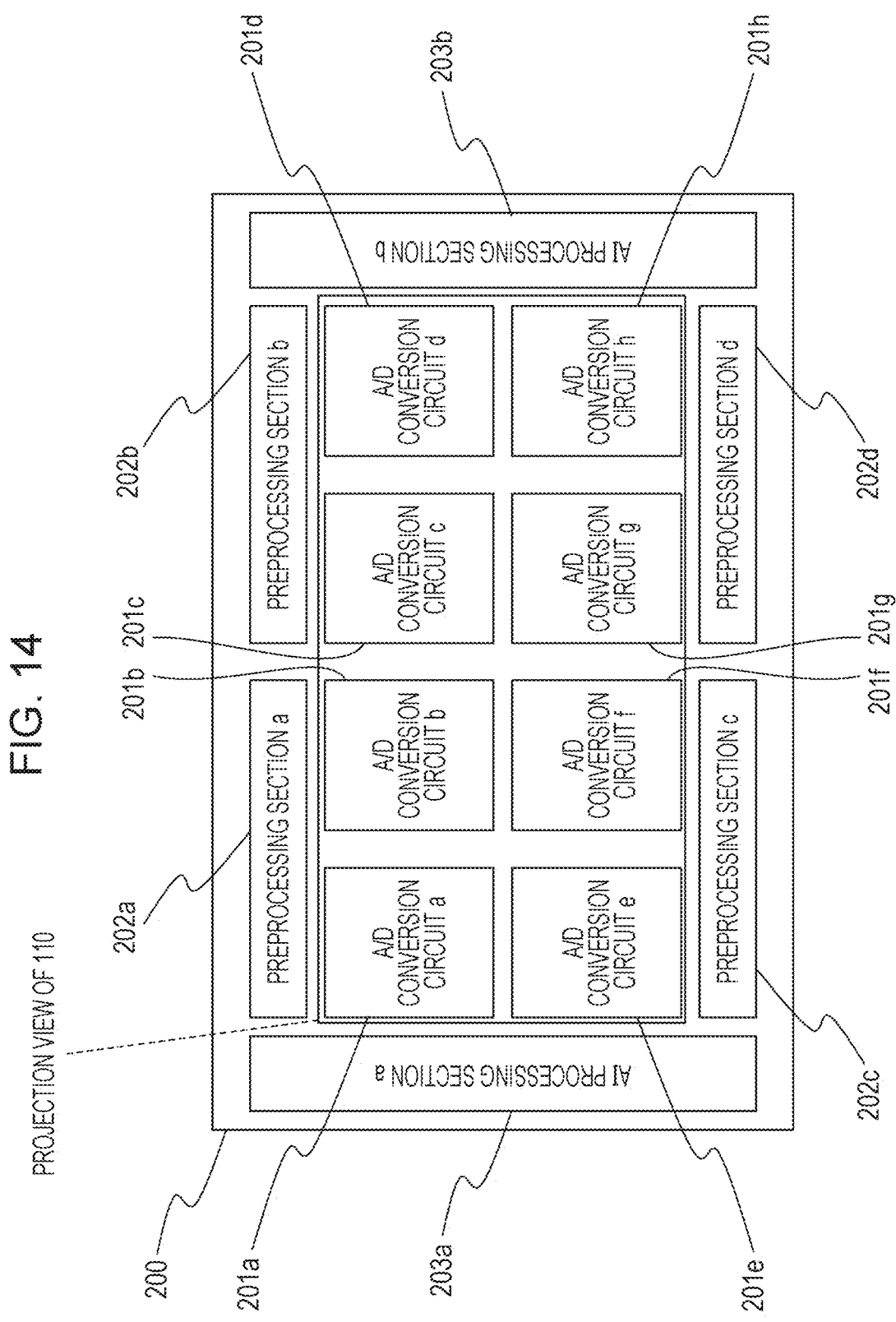
FIG. 14 is a diagram illustrating the configuration of a second substrate.

As illustrated in FIG. 14, the AI processing sections are also effective when placed outside the pixel array when viewed from above the first substrate and the second substrate in plan view. FIG. 14 illustrates the projected position on the second substrate in plan view of the pixel array section 110 provided on the first substrate. The AI processing sections 203a and 203b are positioned not overlapping with the pixel array section 110 in plan view. This allows the pixel array section 110 to be less susceptible to the heat generated by the AI processing sections 203a and 203b. The preprocessing sections 202a to 202d are also positioned not overlapping with the pixel array section 110 in plan view. This allows the pixel array section 110 to be less susceptible to the heat generated by the preprocessing sections 202a to 202d.

The operating speed may be changed among the multiple AI processing sections. In this case, an AI processing section with a higher operating speed may be disposed farther away from the pixel array position in plan view compared to an AI processing section with a lower operating speed. Since the AI processing section with a higher operating speed generates more heat, this configuration may reduce the impact of the heat from the AI processing section on the pixel array section.

Although this specification shows an example in which the AI processing sections are provided on the second substrate, the AI processing sections may also be provided on the first substrate.

Eighth Embodiment

Figure 19:
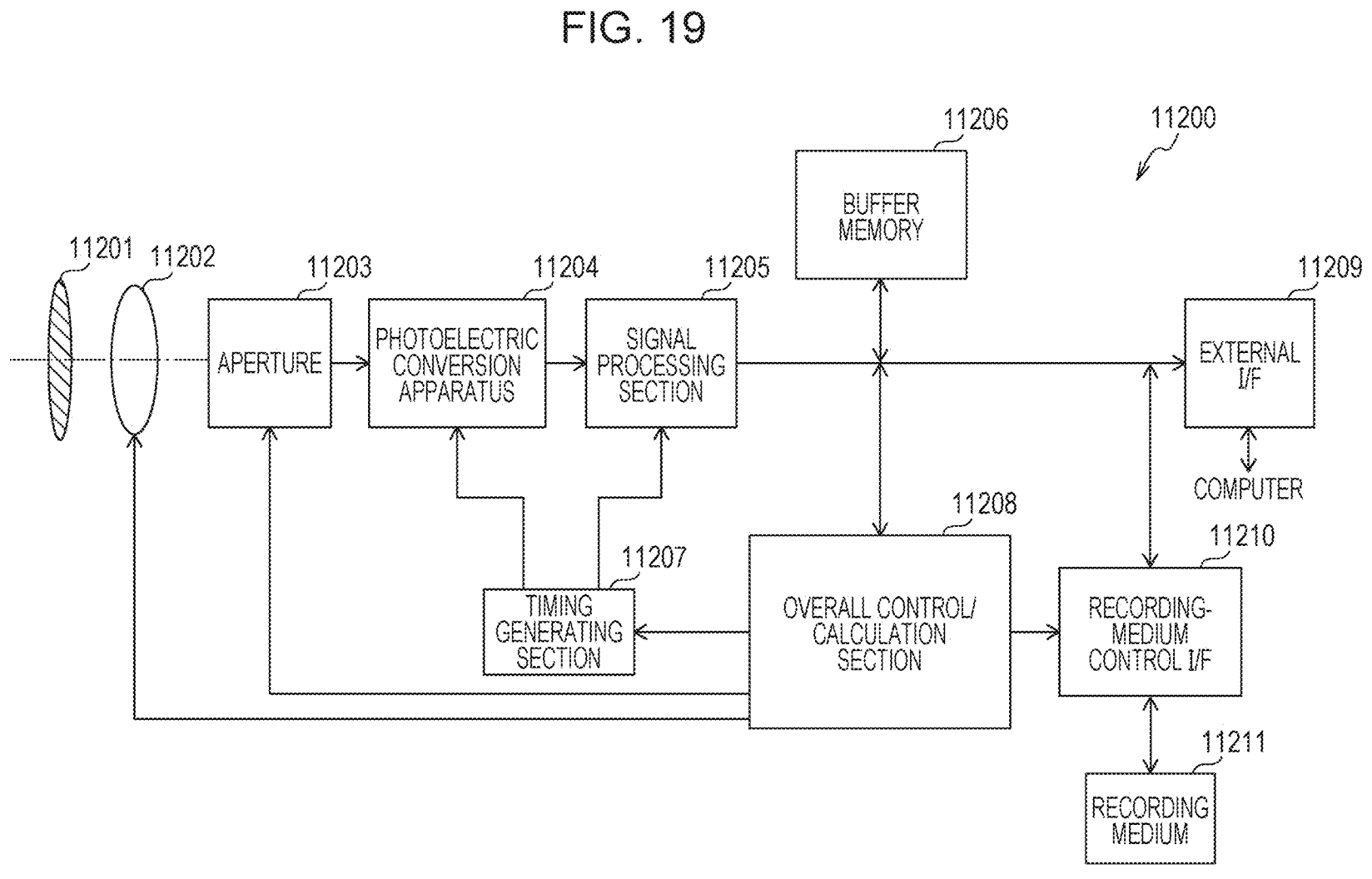

FIG. 19 is a block diagram illustrating the configuration of a photoelectric conversion system 11200 according to this embodiment. The photoelectric conversion system 11200 of this embodiment includes a photoelectric conversion apparatus 11204. The photoelectric conversion apparatus 11204 may be any of the photoelectric conversion apparatuses described in the above embodiments. For example, the photoelectric conversion system 11200 may be used as an image capturing system. Specific examples of the image capturing system include a digital still camera, a digital camcorder, a monitoring camera, and a network camera. FIG. 19 illustrates an example of the digital still camera as the photoelectric conversion system 11200.

The photoelectric conversion system 11200 illustrated in FIG. 19 includes the photoelectric conversion apparatus 11204 and a lens 11202 that forms an optical image of an object on the photoelectric conversion apparatus 11204. The photoelectric conversion system 11200 further includes a diaphragm 11203 for varying the amount of light passing through the lens 11202 and a barrier 11201 for protecting the lens 11202. The lens 11202 and the diaphragm 11203 constitute an optical system for collecting light onto the photoelectric conversion apparatus 11204.

The photoelectric conversion system 11200 includes a signal processing section 11205 for processing signals output from the photoelectric conversion apparatus 11204. The signal processing section 11205 performs a signal processing operation for performing various corrections and compression of the input signals as needed and outputting the signals. The photoelectric conversion system 11200 further includes a buffer memory 11206 for temporarily storing image data and an external interface (an external I/F) 11209 for communicating with an external computer or the like. The photoelectric conversion system 11200 further includes a recording medium 11211, such as a semiconductor memory, for recording or reading captured image data and a recording-medium control interface (a recording-medium control I/F) 11210 for recording to or reading from the recording medium 11211. The recording medium 11211 may be housed in the photoelectric conversion system 11200 or may be detachable. The communication with the recording medium 11211 via the recording-medium control I/F 11210 and the communication via the external I/F 11209 may be by radio.

The photoelectric conversion system 11200 further includes an overall control/calculation section 11208 that performs various calculations and controls the entire digital still camera and a timing generating section 11207 that outputs various timing signals to the photoelectric conversion apparatus 11204 and the signal processing section 11205. The timing signals may be input from the outside, and the photoelectric conversion system 11200 may include at least the photoelectric conversion apparatus 11204 and the signal processing section 11205 that processes the signals output from the photoelectric conversion apparatus 11204. The overall control/calculation section 11208 and the timing generating section 11207 may be configured to perform some or all of the control functions of the photoelectric conversion apparatus 11204.

The photoelectric conversion apparatus 11204 outputs an imaging signal to the signal processing section 11205. The signal processing section 11205 performs predetermined signal processing on the imaging signals output from the photoelectric conversion apparatus 11204 and outputs image data. The signal processing section 11205 generates an image using the imaging signals. The signal processing section 11205 may perform distance calculation on the signals output from the photoelectric conversion apparatus 11204. The signal processing section 11205 and the timing generating section 11207 may be installed in the photoelectric conversion apparatus 11204. In other words, the signal processing section 11205 and the timing generating section 11207 may be provided on the substrate with pixels or on another substrate. Using the photoelectric conversion apparatuses of the above embodiments to form an image capturing system enables the image capturing system to capture higher quality images.

Ninth Embodiment

FIG. 20 is a block diagram illustrating an example of the configuration of a distance image sensor, which is an electronic device utilizing the photoelectric conversion apparatus according to the above-described embodiment.

As shown in FIG. 20, the distance image sensor 12401 includes an optical system 12402, a photoelectric conversion apparatus 12403, an image processing circuit 12404, a monitor 12405, and a memory 12406. The distance image sensor 12401 may obtain a distance image corresponding to the distance to the subject by receiving the light applied from a light source 12411 to the subject and reflected by the surface of the subject (modulated light or pulsed light).

The optical system 12402 includes one or multiple lenses and guides the image light (incident light) from the subject to the photoelectric conversion apparatus 12403 to form an image on the light receiving surface (sensor) of the photoelectric conversion apparatus 12403.

One of the photoelectric conversion apparatuses of the above embodiments is used as the photoelectric conversion apparatus 12403. A distance signal representing the distance obtained from the received light signal output from the photoelectric conversion apparatus 12403 is supplied to the image processing circuit 12404.

The image processing circuit 12404 performs image processing for forming a distance image based on the distance signal supplied from the photoelectric conversion apparatus 12403. The distance image (image data) obtained by the image processing is supplied to the monitor 12405 for display or supplied to the memory 12406 for storage (recording).

The distance image sensor 12401 configured in this way may obtain, for example, a more accurate distance image, with the improvement of the pixel characteristics by using the above photoelectric conversion apparatus.

10th Embodiment

The technique (present technique) according to embodiments of the present disclosure is applicable to various products. For example, the technique according to an embodiment of the present disclosure may be applied to an endoscopic surgery system.

Figure 21:
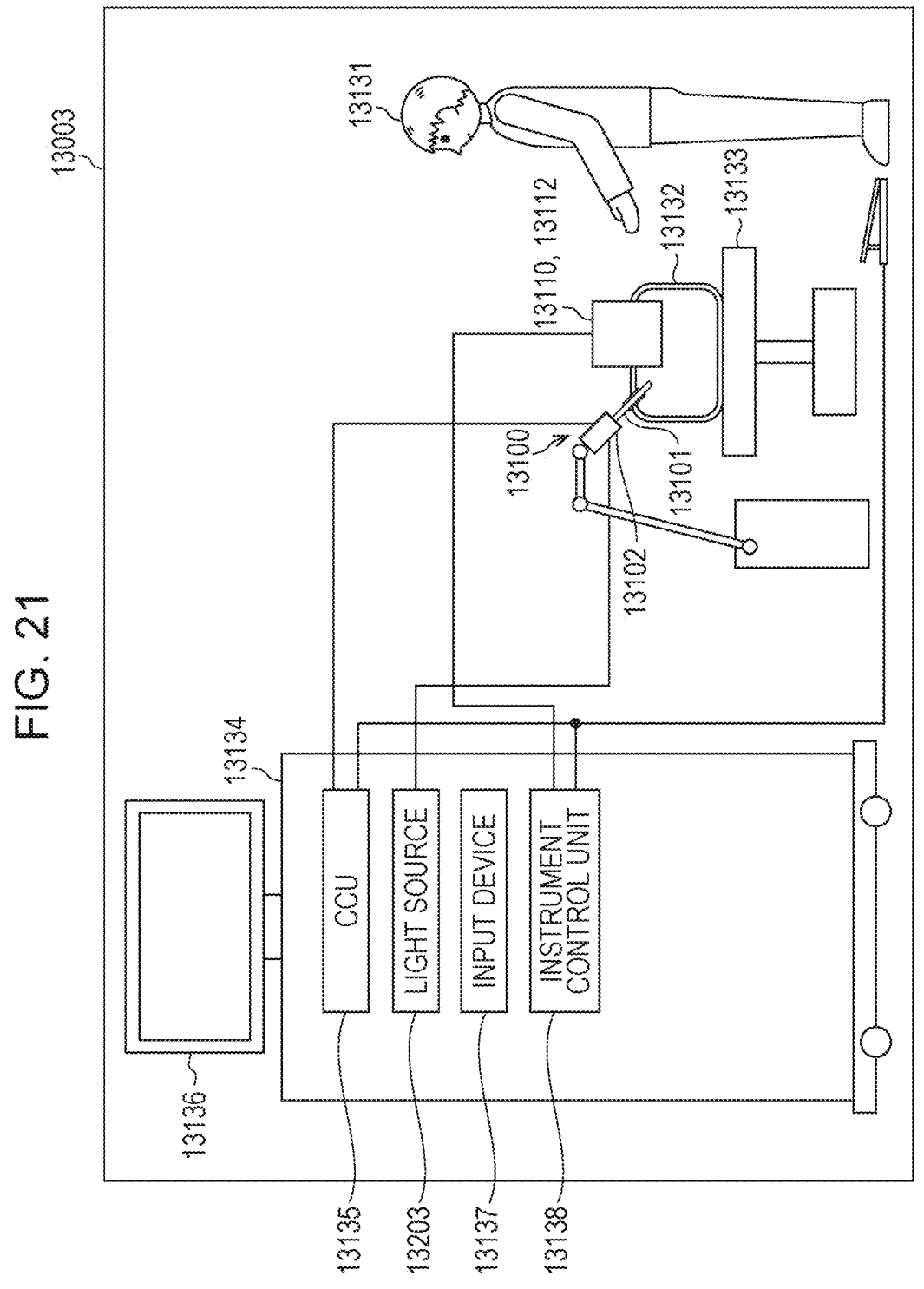
FIG. 21 is a functional block diagram illustrating an endoscopic surgery system.

FIG. 21 is a diagram illustrating an example of the schematic configuration of the endoscopic surgery system to which the technique (the present technique) according to an embodiment of the present disclosure is applicable.

FIG. 21 illustrates a state in which an operator (doctor) 13131 performs surgery on a patient 13132 on a patient bed 13133 using an endoscopic surgery system 13003. As shown, the endoscopic surgery system 13003 includes an endoscope 13100, a surgical instrument 13110, and a cart 13134 in which various apparatuses for endoscopic surgery are mounted.

The endoscope 13100 includes a lens tube 13101 to be inserted into the body cavity of the patient 13132 by a predetermined length from the leading end and a camera head 13102 connected to the base end of the lens tube 13101. In the illustrated example, the endoscope 13100 is a so-called rigid scope including the rigid lens tube 13101.

Alternatively, the endoscope 13100 may be a so-called flexible scope including a flexible lens tube.

The lens tube 13101 includes an opening in which an object lens is fitted at the leading end. The endoscope 13100 connects to a light source 13203. The light generated by the light source 13203 is guided to the leading end of the lens tube 13101 by a light guide extending in the lens tube 13101. The light is applied to the observation target in the body cavity of the patient 13132 via the object lens. The endoscope 13100 may be a direct-vision scope, a straboscope, or a lateral-vision scope.

The camera head 13102 houses an optical system and a photoelectric conversion apparatus. The reflected light (observation light) from the observation target is collected to the photoelectric conversion apparatus by the optical system. The observation light is photoelectrically converted by the photoelectric conversion apparatus to form an electrical signal corresponding to the observation light, that is, an image signal corresponding to the observed image. The photoelectric conversion apparatus may be the photoelectric conversion apparatus according to any one of the embodiments. The image signal is transmitted to a camera control unit (CCU) 13135 as raw data.

The CCU 13135 is constituted by a central processing unit (CPU) or a graphics processing unit (GPU), which provides control over the operation of the endoscope 13100 and a display 13136. The CCU 13135 receives the image signal from the camera head 13102 and performs various image processing operations for displaying an image based on the image signal, such as development processing (demosaic processing), on the image signal.

The display 13136 displays an image based on the image signal subjected to image processing by the CCU 13135 under the control of the CCU 13135.

The light source 13203 includes a light source, such as a light emitting diode (LED), and supplies irradiation light in capturing an image of the operative site or the like to the endoscope 13100.

An input device 13137 is an input interface for the endoscopic surgery system 13003. The user may input various kinds of information and instructions to the endoscopic surgery system 13003 via the input device 13137.

An instrument control unit 13138 controls driving of an energy instrument 13112 for cauterization or incision of tissue or sealing of blood vessels.

The light source 13203 that supplies irradiation light for capturing an image of the operative site to the endoscope 13100 may include a while light source formed of an LED, a laser light source, or a combination thereof. If the white light source is a combination of red, green, and blue (RGB) laser sources, the output intensities and output timings of the individual colors (wavelengths) may be controlled with high accuracy. This enables the light source 13203 to adjust the white balance of the captured image. In this case, images corresponding to RGB may be captured in time-division by applying RGB laser beams from the individual RGB laser sources to the observation target and controlling the driving of the image sensor of the camera head 13102 in synchronism with the irradiation timings. This method allows for acquiring a color image even if the image sensor has no color filter.

The driving of the light source 13203 may be controlled so as to change the intensity of the output light at predetermined intervals. Controlling the driving of the image sensor of the camera head 13102 in synchronism with the timing of the change in light intensity to acquire images in time-division and combining the images allows for generating an image in a highly dynamic range without black underexposure images and blown out highlights.

The light source 13203 may be configured to supply light in a predetermined wavelength band corresponding to special light observation. The special light observation uses, for example, the wavelength dependence of light absorption in body tissue. Specifically, the special light observation applies light in a wavelength band narrower than that of irradiation light at normal observation (that is, white light) to capture an image of predetermined tissue, such as the blood vessels of the superficial portion of a mucous membrane, with high contrast. The special light observation may include fluorescence observation for capturing an image with fluorescence generated by applying exciting light. The fluorescence observation applies exciting light to body tissue to observe fluorescence from the body tissue or locally injects a reagent, such as indocyanine green (ICG), to body tissue and applies exciting light corresponding to the fluorescence wavelength of the reagent to the body tissue to capture a fluorescent image. The light source 13203 may be configured to supply narrow-band light and/or exciting light corresponding to such special light observation.

11th Embodiment

Figure 22A:
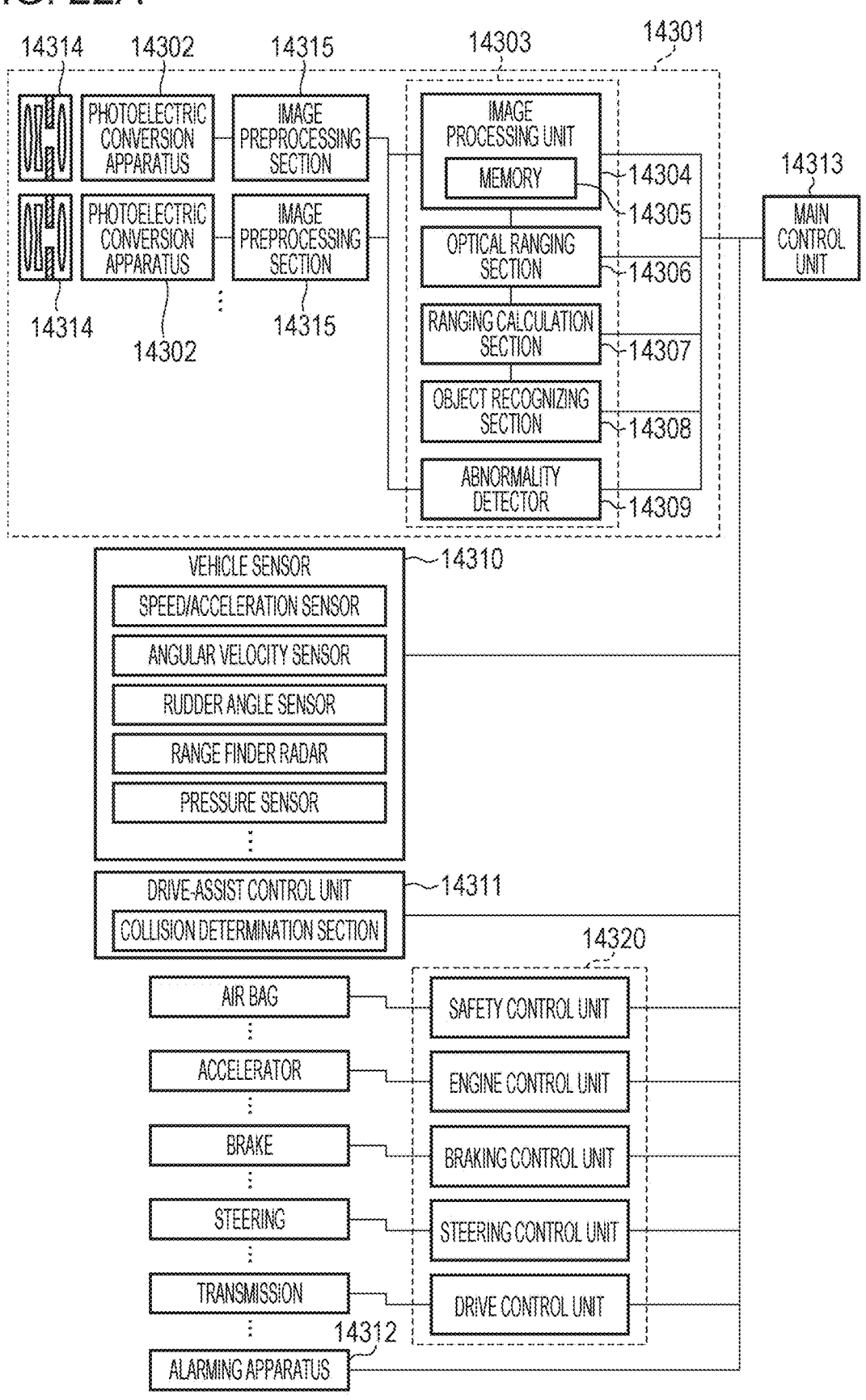
FIG. 22A is a diagram illustrating a photoelectric conversion system and a movable object.
Figure 22B:
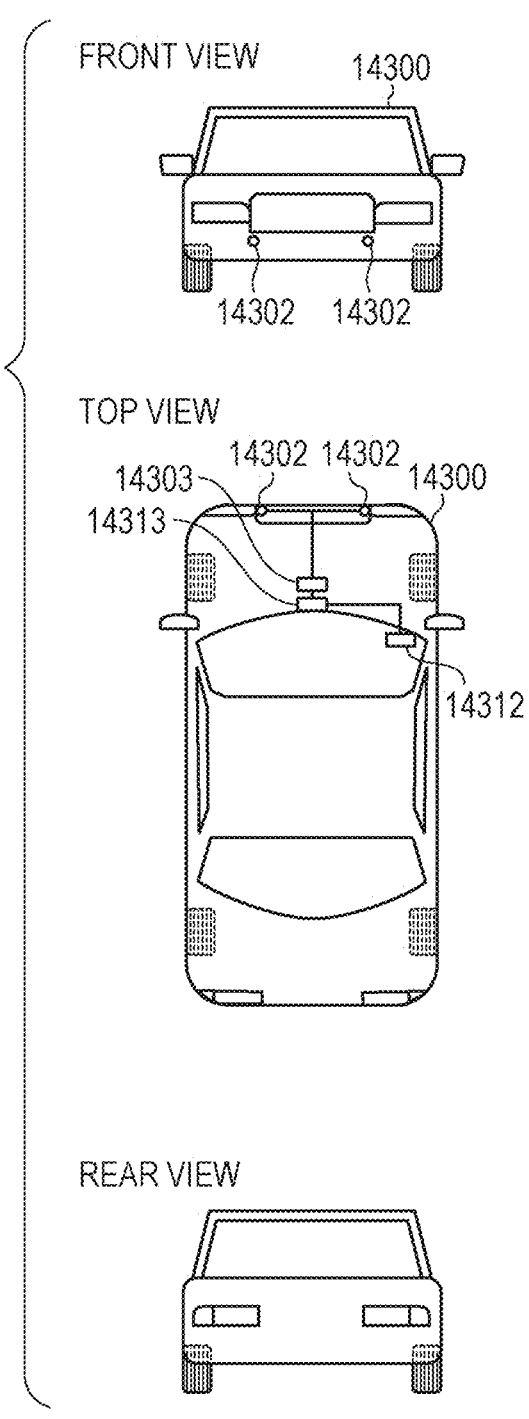
FIG. 22B is a diagram illustrating a photoelectric conversion system and a movable object.

A photoelectric conversion system and a movable object of this embodiment will be described with reference to FIGS. 22A and 22B. FIGS. 22A and 22B are diagrams illustrating an example of the configuration of the photoelectric conversion system and the movable object of this embodiment. In this embodiment, an example of on-vehicle cameras is illustrated as the photoelectric conversion system.

FIGS. 22A and 22B illustrate an example of a vehicle system and an image-capturing photoelectric conversion system installed in the vehicle. The photoelectric conversion system 14301 includes a photoelectric conversion apparatus 14302, an image preprocessing section 14315, an integrated circuit 14303, and an optical system 14314. The optical system 14314 forms an optical image of the subject on the photoelectric conversion apparatus 14302. The photoelectric conversion apparatus 14302 converts the optical image of the subject formed by the optical system 14314 to an electrical signal. The photoelectric conversion apparatus 14302 is one of the photoelectric conversion apparatuses of the above embodiments. The image preprocessing section 14315 performs predetermined signal processing on the signal output from the photoelectric conversion apparatus 14302. The function of the image preprocessing section 14315 may be incorporated in the photoelectric conversion apparatus 14302. The photoelectric conversion system 14301 includes at least two sets of the optical system 14314, the photoelectric conversion apparatus 14302, and the image preprocessing section 14315 and is configured to input the output from each image preprocessing section 14315 to the integrated circuit 14303.

The integrated circuit 14303 is for use in an image capturing system and includes an image processing unit 14304 including a memory 14305, an optical ranging section 14306, a ranging calculation section 14307, an object recognition section 14308, and an abnormality detector 14309. The image processing unit 14304 performs image processing, such as a developing process and defect correction, on the output signals from the image preprocessing section 14315. The memory 14305 stores a primary storage for captured images and the defect position of image capturing pixels. The optical ranging section 14306 performs focusing and ranging of the subject. The ranging calculation section 14307 calculates ranging information from multiple image data obtained from the multiple photoelectric conversion apparatus 14302. The object recognition section 14308 performs recognition of vehicles, roads, signs, human, or other subjects. The abnormality detector 14309, upon detecting an abnormality in the photoelectric conversion apparatus 14302, reports the abnormality to a main control unit 14313.

The integrated circuit 14303 may be implemented by specifically designed hardware, a software module, or a combination thereof. The integrated circuit 14303 may also be implemented by a field-programmable gate array (FPGA), an application specific integrated circuit (ASIC), or a combination thereof.

The main control unit 14313 provides overall control of the operation of the photoelectric conversion system 14301, a vehicle sensor 14310, a control unit 14320, and so on. The main control unit 14313 may be omitted. Instead, the photoelectric conversion system 14301, the vehicle sensor 14310, and the control unit 14320 may individually have a communication interface and transmit and receive control signals via a communication network (for example, a controller area network (CAN) standard).

The integrated circuit 14303 has a function for receiving control signals from the main control unit 14313 or transmitting control signals and setting values to the photoelectric conversion apparatus 14302 with its own controller.

The photoelectric conversion system 14301 is connected to a vehicle sensor 14310 and may detect the driving condition of the vehicle itself, such as a vehicle speed, a yaw rate, and a rudder angle, the environment outside the vehicle, and the states of other vehicles and obstacles. The vehicle sensor 14310 also serves as a distance-information acquisition means for acquiring information on the distance to the target. The photoelectric conversion system 14301 is also connected to a drive-assist control unit 13111 that provides various driver assistance, such as automatic steering, automatic cruising, and collision prevention functions. In particular, for the collision prevention functions, the drive-assist control unit 13111 estimates collisions with other vehicles or obstacles based on the detection results of the photoelectric conversion system 14301 and the vehicle sensor 14310 and determines whether a collision has occurred. This enables avoidance control in case of estimated collisions and activation of safety devices at collisions.

The photoelectric conversion system 14301 is also connected to an alarming apparatus 14312 that gives an alarm to the driver based on the determination result of a collision determination section. For example, if the determination result of the collision determination section shows a high possibility of collision, then the main control unit 14313 controls the vehicle to avoid a collision or reduce damage by braking, returning the accelerator, or reducing engine output. The alarming apparatus 14312 alarms the user by giving an alarm sound, displaying alarm information on the screen of a car navigation system or an instrument panel, or vibrating the seat belt or the steering.

This embodiment captures an image of the surroundings of the vehicle, for example, ahead or the back, with the photoelectric conversion system 14301. FIG. 22B shows an example of the arrangement of the photoelectric conversion system 14301 when capturing an image ahead of the vehicle.

Two photoelectric conversion apparatuses 14302 are positioned at the front of the vehicle 14300. Specifically, the two photoelectric conversion apparatuses 14302 are arranged in line symmetry about the center line of the azimuth of the vehicle 14300 or the outline (or the vehicle width). This arrangement is desirable in obtaining the information on the distance between the vehicle 14300 and the subject and determining collision probability. The photoelectric conversion apparatus 14302 may be positioned so that it does not obstruct the driver's field of view when the driver views the situation outside the vehicle 14300 from the driver's seat. The alarming apparatus 14312 may be positioned to be easily accessible to the driver's field of view.

Although the above embodiment illustrates control to avoid collisions with other vehicles, the photoelectric conversion system 14301 is also applicable to automated cruise control for following another vehicle and automated cruise control for preventing the vehicle from straying out of the lane. The photoelectric conversion system 14301 is also applicable not only to vehicles, such as automobiles, but also to movable objects (movable apparatuses), such as ships, aircrafts, and industrial robots. In addition, the photoelectric conversion system 14301 is applicable not only to movable objects but also to various equipment that use object recognition, such as an intelligent transportation system (ITS).

The photoelectric conversion apparatuses according to embodiments of the present invention may be configured to acquire distance information and other various information.

12th Embodiment

Figure 23A:
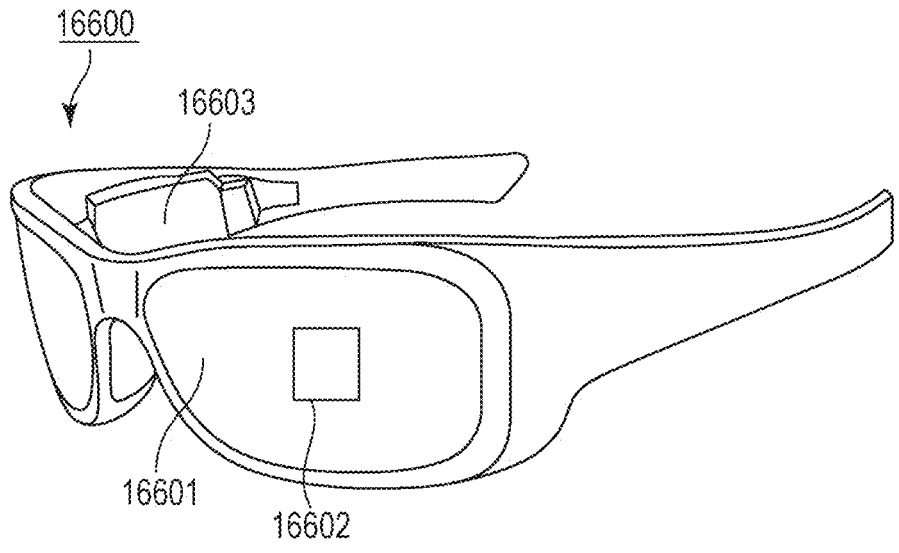
FIG. 23A is a schematic diagram of smartglasses.

FIG. 23A illustrates eyeglasses 16600 (smartglasses) according to an example of application. The eyeglasses 16600 include a photoelectric conversion apparatus 16602. The photoelectric conversion apparatus 16602 is one of the photoelectric conversion apparatuses described in the above embodiments. A display including a light-emitting unit, such as an organic light-emitting diode (OLED) or an LED, may be disposed on the back of lenses 16601. The number of the photoelectric conversion apparatuses 16602 may be one or two or more. Alternatively, multiple types of photoelectric conversion apparatuses may be combined. The placement position of the photoelectric conversion apparatus 16602 is not limited to that in FIG. 23A.

The eyeglasses 16600 further include a control unit 16603. The control unit 16603 functions as a power source that supplies electric power to the photoelectric conversion apparatus 16602 and the display. The control unit 16603 controls the operation of the photoelectric conversion apparatus 16602 and the display. The lenses 16601 include an optical system for collecting light to the photoelectric conversion apparatus 16602.

Figure 23B:
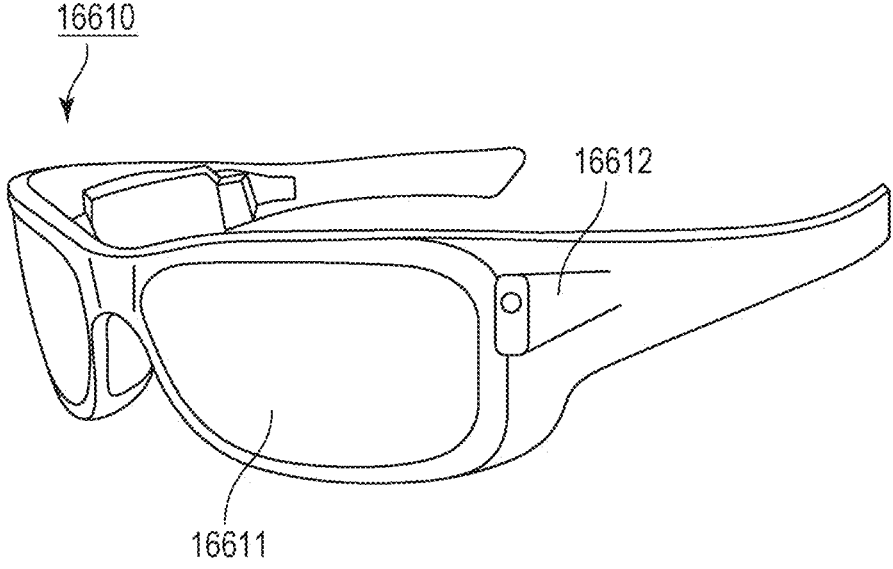
FIG. 23B is a schematic diagram of smartglasses.

FIG. 23B illustrates eyeglasses 16610 (smartglasses) according to an example of application. The eyeglasses 16610 includes a control unit 16612. The control unit 16612 includes a photoelectric conversion apparatus corresponding to the photoelectric conversion apparatus 16602 and a display. Lenses 16611 include the photoelectric conversion apparatus in the control unit 16612 and an optical system for projecting light from the display. The lenses 16611 receive a projected image. The control unit 16612 functions as a power source that supplies electric power to the photoelectric conversion apparatus and the display and controls the operation of the photoelectric conversion apparatus and the display. The control unit may include a line-of-sight detector that detects the line of sight of the wearer. The line-of-sight detection may use infrared light. An infrared-emitting unit emits infrared light to the eyeballs of the user who is looking at the displayed image. The reflected light of the generated infrared light reflected from the eyeballs is detected by an imaging unit including a light-receiving element to give a captured image of the eyeballs. Providing a reducing unit that reduces the light from the infrared-emitting unit to the display in plan view reduces a decrease in image quality.

The line of sight of the user to the displayed image is detected from the captured image of the eyeballs obtained by infrared imaging. The line-of-sight detection using the captured image of the eyeballs may use any known method. One example is a method of line-of-sight detection based on a Purkinje image using reflection of irradiation light from the cornea.

More specifically, a line-of-sight detection process based on a pupil center corneal reflection method is performed. The line of sight of the user is detected by calculating the eye vector indicating the orientation (rotational angle) of the eyeballs based on the image of the pupils included in a captured image of the eyeballs and the Purkinje image using the pupil center corneal reflection method.

The display of this embodiment may include a photoelectric conversion apparatus including a light-receiving element and may control a displayed image on the display based on line-of-sight information on the user from the photoelectric conversion apparatus.

Specifically, the display is segmented into a first view area at which the user looks and a second view area other than the first view area based on line-of-sight information. The first view area and the second view area may be determined by a control unit for the display or may be received after being determined by an external control unit. In the display area of the display, the display resolution of the first view area may be controlled so as to be higher than the display resolution of the second view area. In other words, the resolution of the second view area may be lower than the resolution of the first view area.

The display area may include a first display area and a second display area different from the first display area. A higher priority area may be determined from the first display area and the second display area based on line-of-sight information. The first view area and the second view area may be determined by the control unit of the display or may be received after being determined by an external control unit. The resolution of a higher priority area may be controlled so as to be higher than the resolution of an area other than the higher priority area. In other words, the resolution of a relatively low priority area may be set lower.

The determination of the first view area and the higher priority area may be made using artificial intelligence (AI). The AI may be a model configured to estimate the angle of the line of sight and the distance to the object of the line of sight using the images of eyeballs and the direction in which the eyeballs of the images actually view as training data. An AI program may be provided in the display, the photoelectric conversion apparatus, or an external apparatus. The AI program, if provided in the external apparatus, is transmitted to the display via communication.

Display control based on visual detection is applicable to smartglasses further including a photoelectric conversion apparatus that images the outside. The smartglasses may display the captured external information in real time.

13th Embodiment

Figure 24:
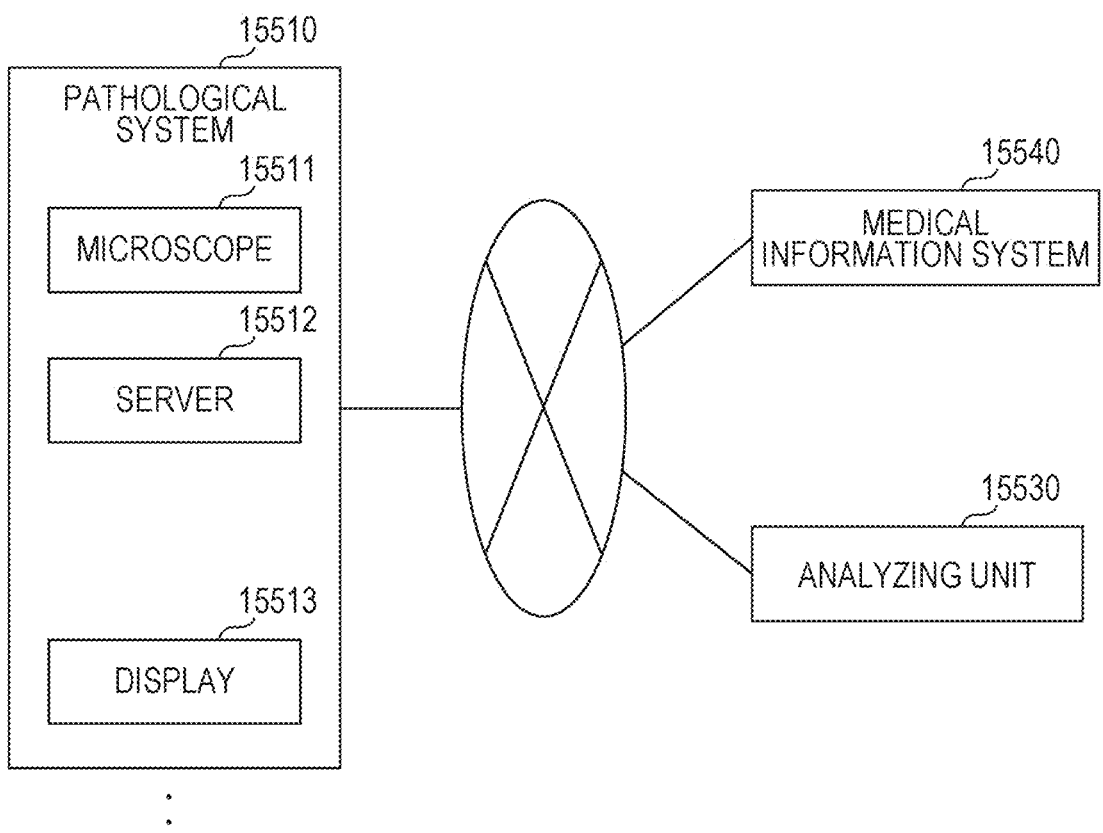
FIG. 24 is a functional block diagram of a diagnosis system.

Referring to FIG. 24, the system of this embodiment will be described. This embodiment is applicable to a pathological diagnosis system for observing cells or tissue collected from patients by physicians or the like to diagnose lesions and a diagnosis assist system for assisting the pathological diagnosis. The system of this embodiment may diagnose lesions based on the obtained image or assist the diagnosis.

The system of this embodiment includes one or more pathological systems 15510, as illustrated in FIG. 24. The system may further include an analyzing unit 15530 and a medical information system 15540.

The one or more pathological systems 15510 are primarily to be used by pathologists and are typically implemented in laboratories or hospitals. The pathological systems 15510 may be implemented in different hospitals and are connected to the analyzing unit 15530 and the medical information system 15540 via a wide area network, a local area network, or another network.

Each pathological system 15510 includes a microscope 15511, a server 15512, and a display 15513.

The microscope 15511 has the function of optical microscopes and captures an image of the specimen placed on a glass slide to acquire a digital pathological image. Examples of the observation target include tissue, cells, a piece of organ, saliva, and blood collected from patients.

The server 15512 stores the pathological images acquired by the microscope 15511 in a storage (not shown). In response to a request for view, the server 15512 may search the pathological images stored in the memory or the like and display a found pathological image on the display 15513. The server 15512 and the display 15513 may be connected via a display controller or the like.

If the observation target is a solid object, such as a piece of organ, the observation target may be, for example, a stained thin slice. The thin slice may be prepared by slicing a block fragment cut from an organ or another specimen. In slicing, the block fragment may be fixed with paraffin or the like.

The microscope 15511 may include a low-resolution image capturing section for low-resolution imaging and a high-resolution image capturing section for high-resolution imaging. The low-resolution image capturing section and the high-resolution image capturing section may be different optical systems or the same optical system. In the case of the same optical system, the resolution of the microscope 15511 may be changed depending on the object to be imaged.

The observation target is placed on a glass slide or the like and mounted on a stage located within the angle of view of the microscope 15511. The microscope 15511 first acquires a full-field image within the angle of view using the low-resolution image capturing section and specifies the region of the observation target from the acquired full-field image. Next, the microscope 15511 divides the region of the observation target into multiple divided regions with a predetermined size and captures the image of each divided region in sequence with the high-resolution image capturing section to acquire a high-resolution image of each divided region. In switching the target divided regions, the stage may be moved, the image capturing optical system may be moved, or both of them may be moved. The divided regions may overlap with the adjacent divided regions to prevent omission of image capturing due to unintended slippage of the glass slide. The full-field image may contain identification information for associating the full-field image with the patient. Examples of the identification information include a character string and QR code®).

The high-resolution images obtained by the microscope 15511 are input to the server 15512. The server 15512 may divide each high-resolution image into sub-images with a smaller size. After generating the sub-images, the server 15512 executes a combining process for combining a predetermined number of adjacent sub-images to generate one image for all the sub-images. The combining process is repeated until one sub-image is finally generated. This process generates a set of sub-images with a pyramid structure, where each level consists of one or more sub-images. In this pyramid structure, the number of pixels of a sub-image of one layer is the same as that of a sub-image of a different layer, but their resolutions differ. For example, when combining four sub-images, each measuring 2×2, to generate one sub-image in an upper layer, the resolution of the sub-image in the upper layer is half the resolution of the combined sub-images in the lower layer.

Constructing a set of sub-images with such a pyramid structure allows for switching the levels of the detail of the observation target displayed on the display depending on the layer to which the tile images of the display target belong. For example, when the sub-images in the lowermost layer are used, the narrow region of the observation target may be displayed in detail, and the higher the layer of the sub-images, the coarser a wide region of the observation target may be displayed.

The generated sub-image set with the pyramid structure may be stored in, for example, a memory. In response to receiving a request to acquire a sub-image containing identification information from another unit (for example, the analyzing unit 15530), the server 15512 transmits a sub-image corresponding to the identification information to the unit.

The sub-image, which is a pathological image, may be generated for each image-capturing condition, such as a focal length or a stain condition. If a sub-image is generated for each image-capturing condition, a specific pathological image and another pathological image corresponding to an image-capturing condition different from the specific image-capturing condition in the same region as the region of the specific pathological image may be displayed side by side. The specific image-capturing condition may be specified by the viewer. If multiple image-capturing conditions are specified by the viewer, pathological images corresponding to the image-capturing conditions in the same region may be displayed side by side.

The server 15512 may store the sub-image set with the pyramid structure in another storage other than the server 15512, for example, a cloud server. Part or the whole of the sub-image generating process may be executed by a cloud server. Using sub-images allows the user to have a feeling as if the user is observing the observation target while changing the observation magnification. In other words, the display control provides a virtual microscope. The virtual observation magnification here actually corresponds to resolution.

The medical information system 15540 is a what-is-called electronic health record system and stores diagnostic information, such as patient identification information, patient disease information, examination information and image information used for diagnosis, diagnostic results, and ethical medicines. For example, a pathological image acquired by capturing an image of the observation target of one patient may be displayed on the display 15513 after being once stored via the server 15512. The pathologist who uses the pathological system 15510 performs pathological diagnosis based on the pathological image displayed on the display 15513. The result of pathological diagnosis performed by the pathologist is stored in the medical information system 15540.

The analyzing unit 15530 may execute analysis on pathological images. For this analysis, a learning model created using mechanical learning may be used. The analyzing unit 15530 may derive as the analytical result a specific region classification result, a tissue identification result, or another result. The analyzing unit 15530 may derive identification results, such as cell information, the number, position, and luminance information, and scoring information thereon. The information obtained by the analyzing unit 15530 may be displayed as diagnosis assist information on the display 15513 of the pathological system 15510.

The analyzing unit 15530 may be a server system including one or more servers (including a cloud server). The analyzing unit 15530 may be installed in, for example, the server 15512, in the pathological system 15510. In other words, various analyses of pathological images may be executed in the pathological system 15510.

The photoelectric conversion apparatuses described in the above embodiments are suitably applicable to, for example, the microscope 15511, among the above apparatuses. Specifically, the photoelectric conversion apparatuses are applicable to the low-resolution image capturing section and/or the high-resolution image capturing section of the microscope 15511. This allows for minimization of the low-resolution image capturing section and/or the high-resolution image capturing section, eventually minimization of the microscope 15511. This facilitates transporting the microscope 15511, thereby facilitating introduction of the system or recombination of the system. Applying the photoelectric conversion apparatuses of the above embodiments allows part or all of the processes from acquisition of a pathological image to analysis of the pathological image to be executed on-the-fly in the microscope 15511, which in turn allows outputting analysis assist information rapidly and accurately.

The configuration described above is applicable not only to the diagnosis assist system but also to general biological microscopes, such as a confocal microscope, a fluorescence microscope, and a video microscope. The observation target may be living specimens, such as cultured cells, fertilized eggs, and sperm, biomaterials such as cell sheets and three-dimensional cell tissue, or living organisms such as zebrafish and mouses. The observation target may also be observed not only on the glass slide but also in a well plate or a laboratory dish.

A moving image may be generated from the still images of the observation target obtained using a microscope. For example, a moving image may be generated from still images captured continuously for a predetermined period, or an image sequence may be generated from still images captured at predetermined intervals. By generating a moving image from still images in this way, the dynamic features of the observation target, including movement of cancer cells, nerve cells, cardiac muscle tissue, sperm, etc., such as beating, elongation, and migration, and the division process of cultured cells and fertilized eggs, may be analyzed using mechanical learning.

Other Embodiments

Although embodiments have been described above, the present invention is not limited to the embodiments and may be changed or modified in various ways. The embodiments are applicable to one another. In other words, part of one embodiment may be replaced with part of another embodiment, or part of one embodiment may be added to part of another embodiment. Part of one embodiment may be deleted.

The disclosure of this specification includes not only what is described in this specification but also all matters ascertainable from this specification and the drawings attached to this specification. The disclosure in this specification includes a complement set of the concepts described in this specification. In other words, if there is a statement in this specification, for example, that "A is larger than B", this specification discloses that "A is not larger than B" even if the description "A is not larger than B" is omitted. This is because the description "A is larger than B" is based on the premise that the case of "A is not larger than B" is taken into account.

The present disclosure may dissipate the heat generated from the second substrate and accelerate processing involving machine learning performed in the second substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A photoelectric conversion apparatus comprising:
   a first substrate including a pixel array having a plurality of pixels including a pixel configured to output a focus detection signal;
   a second substrate layered on the first substrate, the second substrate including an analog-to-digital (A/D) converter including a plurality of A/D conversion circuits that converts a signal output from the first substrate to a digital signal,
   wherein the second substrate further includes a plurality of signal processing sections configured to perform a mechanical learning process, the second substrate including a first signal processing section and a second signal processing section,
   wherein the plurality of A/D conversion circuits includes a plurality of different sets,
   wherein the first signal processing section is disposed in correspondence with one of the plurality of sets, and
   wherein the second signal processing section is disposed in correspondence with another of the plurality of sets; and
   a plurality of structural layers including a first structural layer and a second structural layer between the first substrate and the second substrate,
   wherein the first structural layer is disposed between the first substrate and the second structural layer, and the second structural layer is disposed between the first substrate and the second substrate,
   a bonding portion bonding a first conductive portion of the first structural layer and a second conductive portion of the second structural layer,
   wherein the bonding portion overlaps with the second signal processing section in plan view.

2. The photoelectric conversion apparatus according to claim 1,
   wherein the plurality of sets are arranged in multiple rows and multiple columns, and
   wherein the plurality of sets are disposed between the first signal processing section and the second signal processing section.

3. The photoelectric conversion apparatus according to claim 1,
   wherein the plurality of signal processing sections further includes a third signal processing section and a fourth signal processing section, and
   wherein the A/D converters are provided in a region surrounded by the first signal processing section, the second signal processing section, the third signal processing section, and the fourth signal processing section.

4. The photoelectric conversion apparatus according to claim 3, wherein the first signal processing section, the second signal processing section, the third signal processing section, and the fourth signal processing section are disposed along an outer periphery of the second substrate.

5. The photoelectric conversion apparatus according to claim 4, further comprising:
a plurality of pads along the outer periphery of the second substrate, the pads being configured to receive a signal from outside of the photoelectric conversion apparatus or output a signal to outside of the photoelectric conversion apparatus,
wherein two or more of the first signal processing section, the second signal processing section, the third signal processing section, the fourth signal processing section are disposed between the plurality of pads and the A/D converters.

6. The photoelectric conversion apparatus according to claim 5, wherein all of the plurality of signal processing sections are disposed between the plurality of pads and the A/D converters.

7. The photoelectric conversion apparatus according to claim 1, wherein the first signal processing section and the second signal processing section differ in signal processing speed.

8. The photoelectric conversion apparatus according to claim 1,
wherein each of the plurality of sets includes a preprocessing circuit configured to receive the digital signals from a plurality of A/D conversion circuits included in the set,
wherein each of the plurality of signal processing sections include a plurality of signal processing circuits each configured to perform the mechanical learning process, and
wherein processing results of the preprocessing circuits are input to the plurality of signal processing circuits of the first signal processing section.

9. The photoelectric conversion apparatus according to claim 8, wherein a number of the preprocessing circuits of the second substrate is larger than a number of the plurality of signal processing circuits of the plurality of signal processing sections.

10. The photoelectric conversion apparatus according to claim 1, wherein the second substrate includes a detector configured to perform focus detection using signals output from the pixel array.

11. The photoelectric conversion apparatus according to claim 1, wherein the second signal processing section performs focus detection using signals output from the pixel array.

12. The photoelectric conversion apparatus according to claim 1,
wherein the first conductive portion connects to a plurality of interlayer connections made of a conductive material, and
wherein the second conductive portion connects to a plurality of interlayer connections made of a conductive material.

13. The photoelectric conversion apparatus according to claim 1, further comprising:

another bonding portion overlapping with the second signal processing section in plan view,
wherein the other bonding portion and the bonding portion are connected to one wiring line in the first structural layer.

14. The photoelectric conversion apparatus according to claim 1, further comprising:
another bonding portion overlapping with the second signal processing section in plan view,
wherein the other bonding portion and the bonding portion are connected to one wiring line in the second structural layer.

15. A photoelectric conversion system comprising:
the photoelectric conversion apparatus according to claim 1; and
a signal processing section configured to generate an image using a signal output from the photoelectric conversion apparatus.

16. A movable object comprising:
the photoelectric conversion apparatus according to claim 1, and
a control unit configured to control movement of the movable object using a signal output from the photoelectric conversion apparatus.

17. A photoelectric conversion apparatus comprising:
a first substrate including a pixel array having a plurality of pixels each including a plurality of photoelectric converters; and
a second substrate layered on the first substrate, the second substrate including an analog-to-digital (A/D) converter including a plurality of A/D conversion circuits that converts a signal output from the first substrate to a digital signal,
wherein the second substrate further includes a plurality of signal processing sections configured to perform a mechanical learning process, the second substrate including a first signal processing section and a second signal processing section,
wherein the plurality of A/D conversion circuits includes a plurality of different sets,
wherein the first signal processing section is disposed in correspondence with one of the plurality of sets, and
wherein the second signal processing section is disposed in correspondence with another of the plurality of sets; and
a plurality of structural layers including a first structural layer and a second structural layer between the first substrate and the second substrate,
wherein the first structural layer is disposed between the first substrate and the second structural layer, and the second structural layer is disposed between the first substrate and the second substrate,
a bonding portion bonding a first conductive portion of the first structural layer and a second conductive portion of the second structural layer,
wherein the bonding portion overlaps with the second signal processing section in plan view.

* * * * *